United States Patent [19]
Kobayashi

[11] Patent Number: 5,558,896
[45] Date of Patent: Sep. 24, 1996

[54] METHOD FOR CUTTING A BAR-SHAPED FOOD AND ITS APPARATUS

[75] Inventor: Masao Kobayashi, Fukui, Japan

[73] Assignee: Kobird Co., Ltd., Fukui, Japan

[21] Appl. No.: 379,594

[22] PCT Filed: Aug. 12, 1994

[86] PCT No.: PCT/JP94/01339

§ 371 Date: Feb. 2, 1995

§ 102(e) Date: Feb. 2, 1995

[87] PCT Pub. No.: WO95/05755

PCT Pub. Date: Mar. 2, 1995

[30] Foreign Application Priority Data

Aug. 26, 1993 [JP] Japan .................................. 5-211883
May 1, 1994 [JP] Japan .................................. 6-127987
Jul. 5, 1994 [JP] Japan .................................. 6-153902

[51] Int. Cl.$^6$ ............................... A23P 1/00; A21C 5/00
[52] U.S. Cl. ................ 426/516; 425/132; 425/142; 425/308; 426/503
[58] Field of Search .................... 426/512, 516, 426/503, 282; 425/132, 142, 287, 308, 466; 83/646

[56] References Cited

U.S. PATENT DOCUMENTS 4,734,024  3/1988  Tashiro .................................. 426/516
5,223,277  6/1993  Watanabe et al. ................... 425/132

*Primary Examiner*—George Yeung
*Attorney, Agent, or Firm*—Ronald R. Snider

[57] ABSTRACT

The present invention relates to a method for cutting bar-shaped food and its bar-shaped food apparatus, capable of cutting completely food materials mass-produced and pushed out sequentially in a bar shape without leaving any protrusion on its cutting surface and simultaneously making its cutting surface round. According to the present invention, even if it is bar-shaped food having core including not less than two kinds of food materials, such food can be cut off neatly without exposing its core material to the surface of the outer covering material.

7 Claims, 23 Drawing Sheets

STATE I

STATE II

STATE III

STATE IV

STATE V

STATE VI

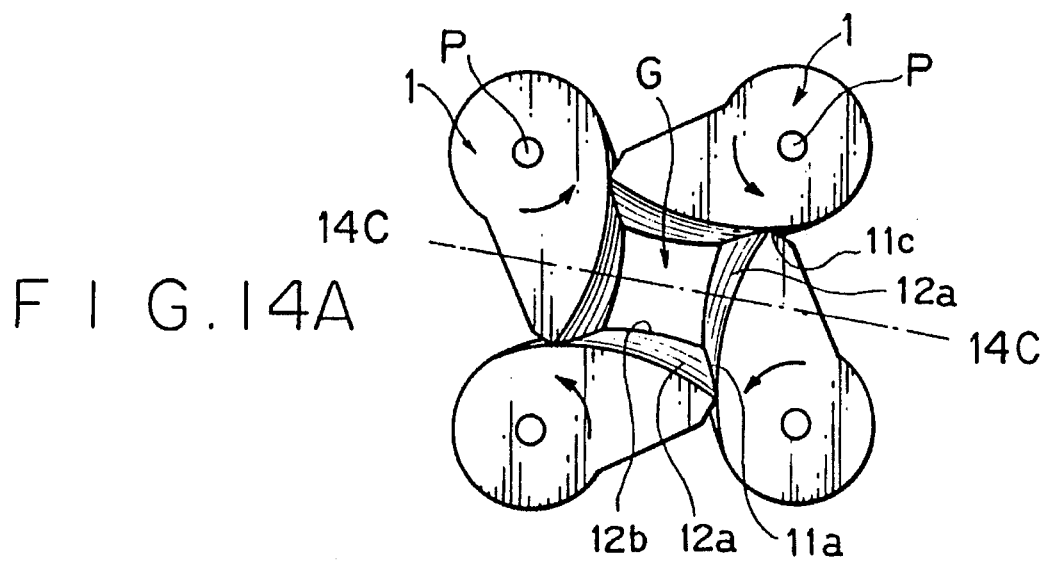
F I G. 14A
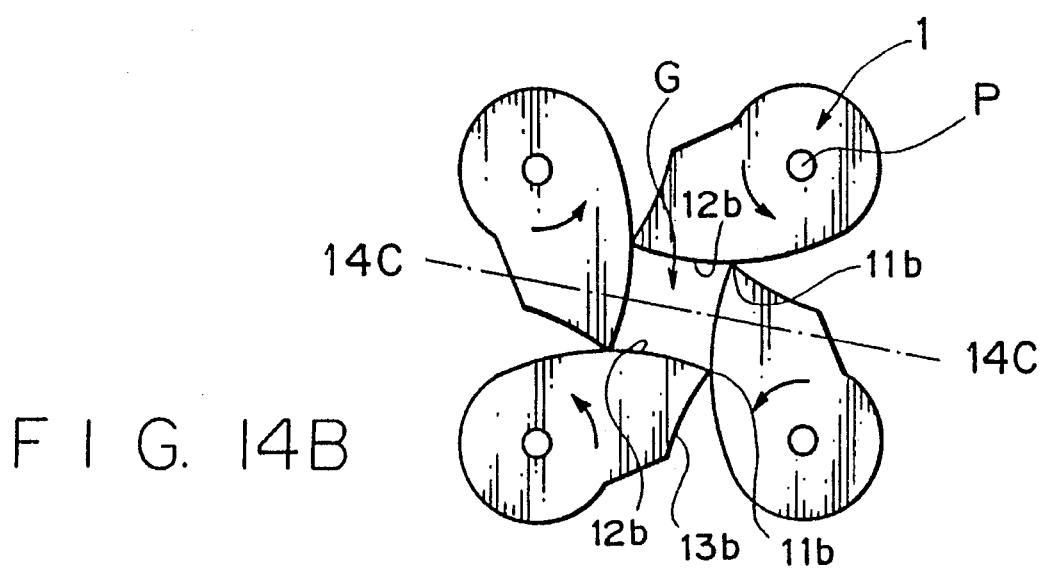
F I G. 14B
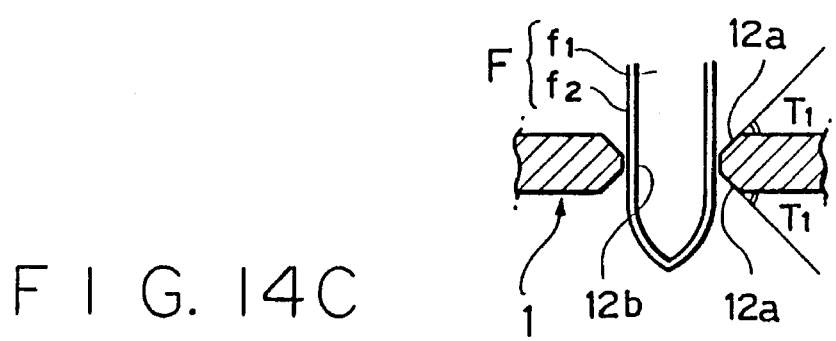
F I G. 14C

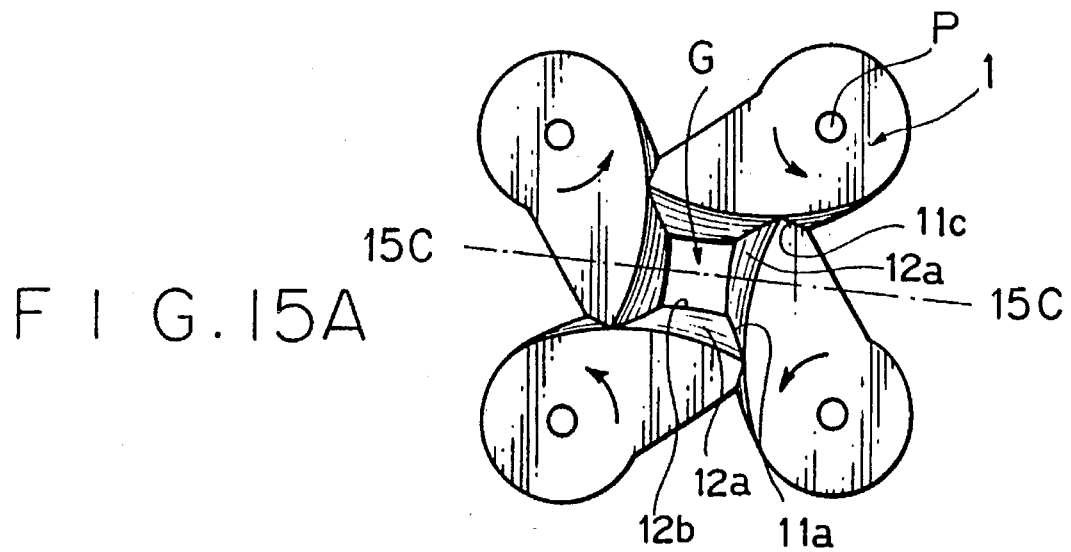
F I G. 15A
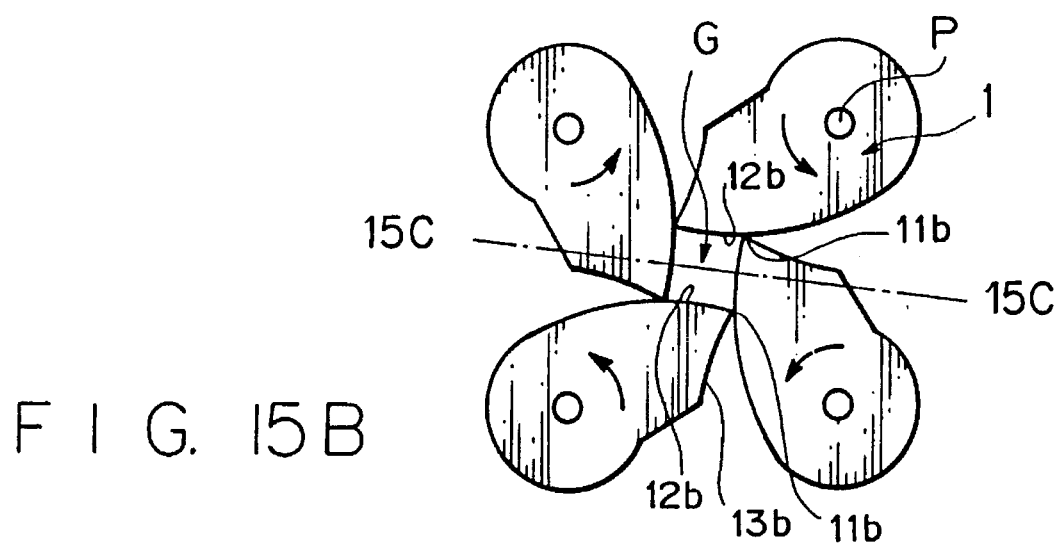
F I G. 15B
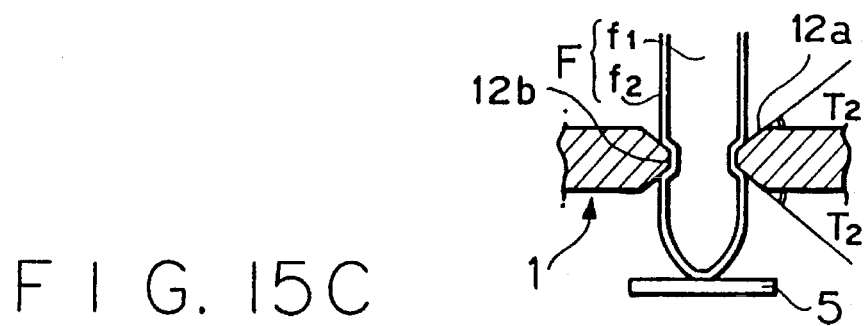
F I G. 15C

STATE IV

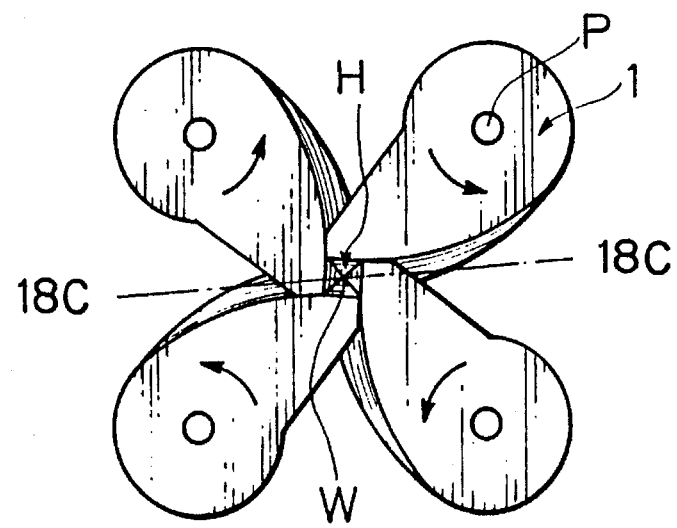
F I G. 18A
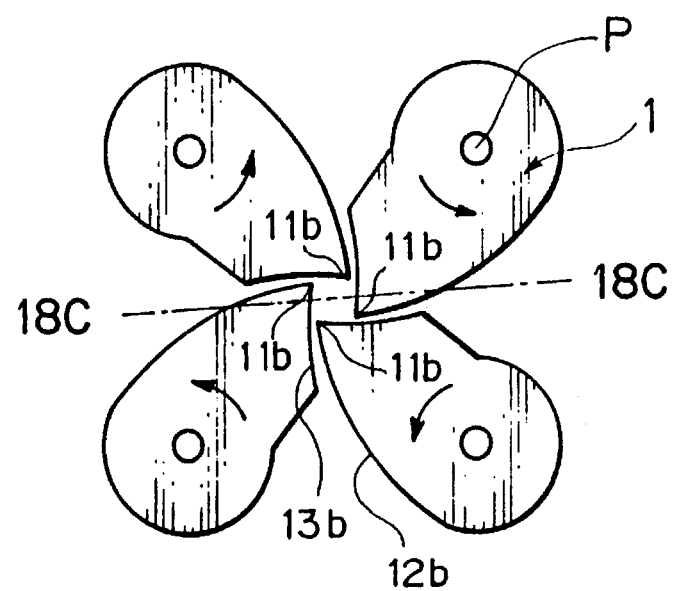
F I G. 18B
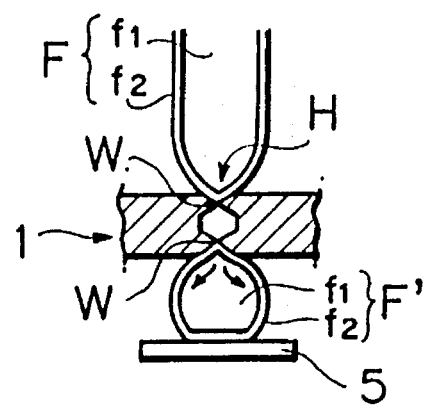
F I G. 18C

F I G. 20
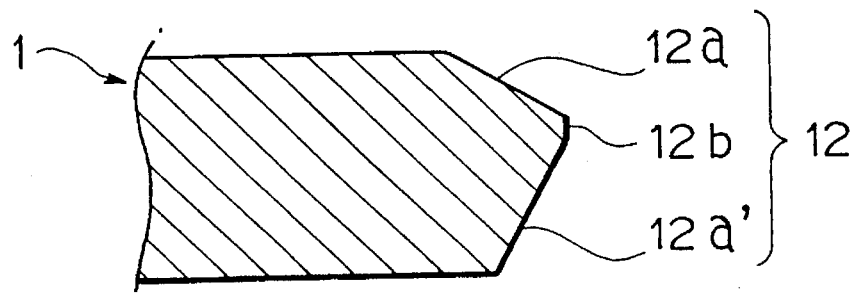
F I G. 21
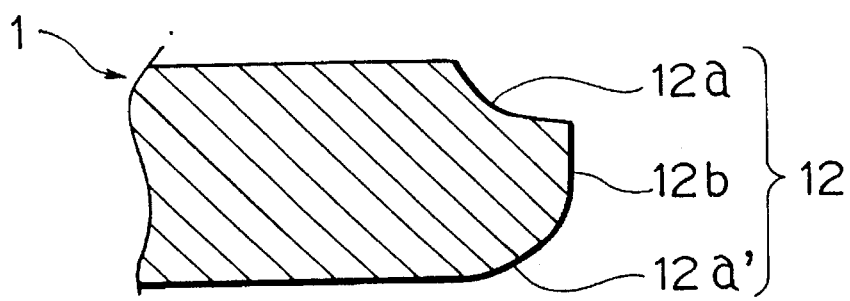
F I G. 22
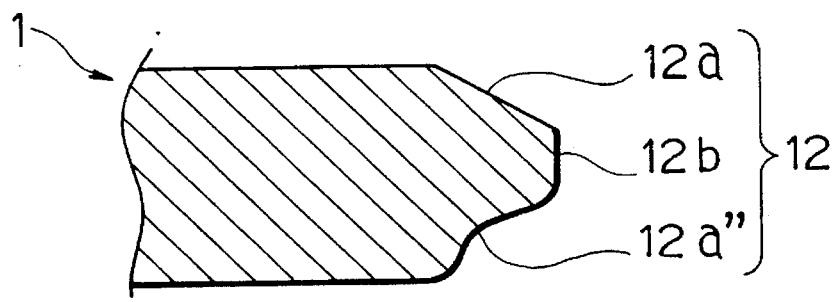

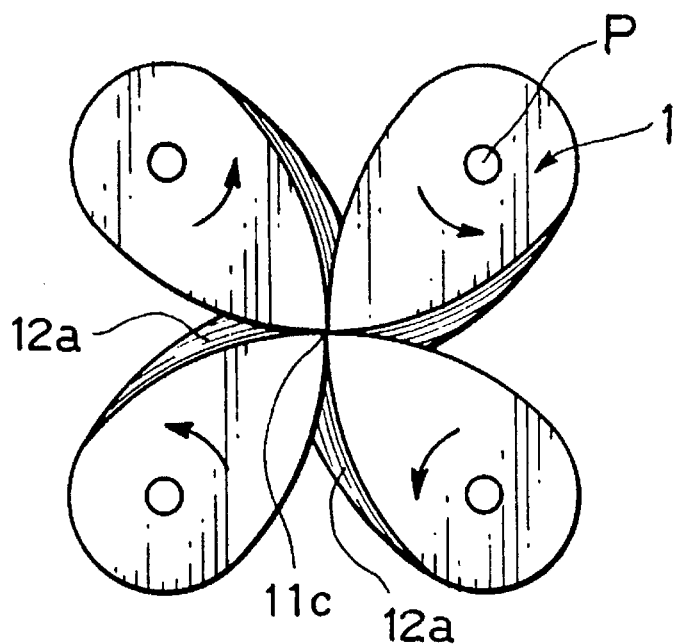
F I G. 27A
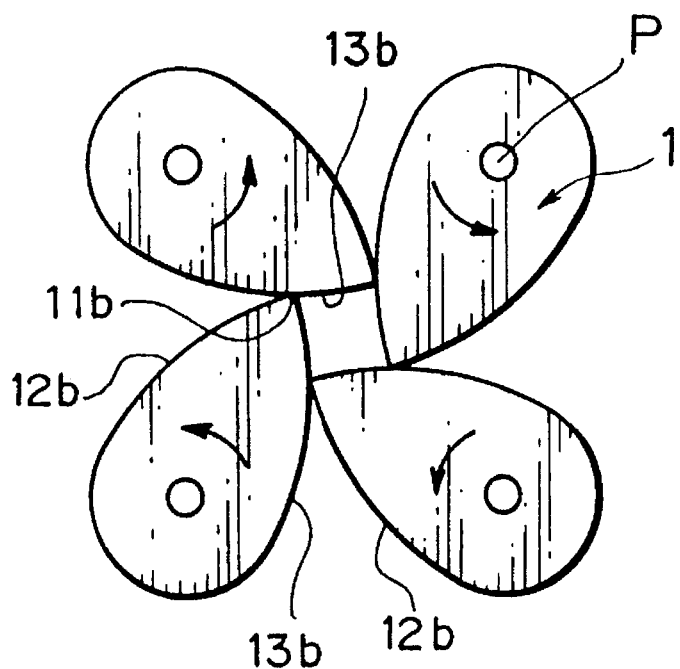
F I G. 27B

F I G. 31
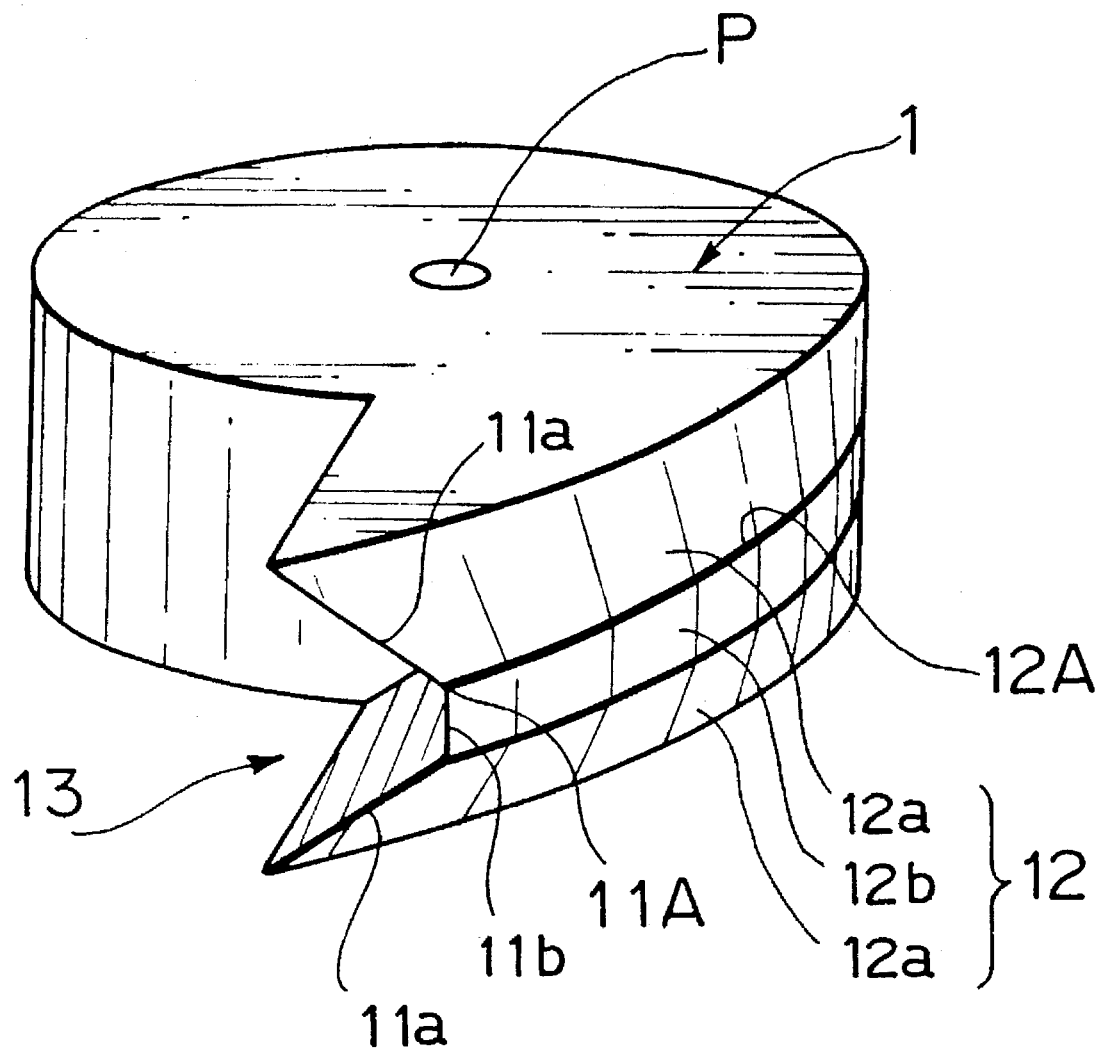

METHOD FOR CUTTING A BAR-SHAPED FOOD AND ITS APPARATUS

FIELD OF THE INVENTION

The present invention relates to a method for cutting a bar-shaped food and its apparatus, capable of cutting completely various bar-shaped food materials pushed out sequentially without leaving any protrusion on its cutting surface and simultaneously making its cutting surface round.

BACKGROUND OF THE INVENTION

In prior art, as a method for cutting food material mass-produced and pushed out sequentially in a bar shape by requied quantity, such a method is well-known that with some square shaped cutters being located at each vertex of a regular polygon, food material is pushed into the cutting area enclosed by each cutter so as to squeeze and cut at the proper position by moving each cutter slidably and straightly at once to the central direction of the polygon. This art is the public domain by Japanese Utility Model Publication No. 63-29433 and Japanese Patent Publication No. 1-42652.

This cutting method, however, has practically various disadvantages as follows:

According to this cutting method, each cutter must be slid straightly to each different direction, which complicates movement transmission system of the machine, and every cutter, osculating each other on their planes, performs sliding movement, which results in large sliding friction and clumsy cutting movement. Additionally, chips of food are packed in the sliding planes, and it prevents cutters from moving at last.

Therefore, the present inventor has developed an apparatus for cutting a bar-shaped food material operated only by simple rotational movement instead of straight-sliding movement of each cutter, under EPC Publication No. EP 0 553 958 A1 and PCT International Application No. PCT/JP93/00644. As shown in FIG. 1 and FIG. 2, in this apparatus, several cutters of similar shape are pivotally arranged along the circumference at regular intervals so as to make a distal end ($e_0$) of each cutter move slidably along the side fringe ($e_1$) of its neighbouring cutter, and while keeping contact relationship among cutters, a cutting gate (g), generated by rotating each cutter at once, is opened and closed, or magnified and reduced. When the cutting gate (g) is opened, a bar-shaped food is conveyed into this cutting gate (g), referring to FIG. 1, and then by gathering each distal end ($e_0$) of the cutters at one point to close the cutting gate (g), the bar-shaped food is constricted to be cut as shown in FIG. 2.

According to this apparatus, since sliding portion accompanied by opening and closing the cutting gate (g) is restricted to the portion of each distal end ($e_0$) of the cutters, sliding friction becomes very small, and without adding any excessive force to each portion of cutting system, smoothly cutting movement of each cutter is enabled, and therefore, the cutting process of bar-shaped food material can be actually achieved sequentially for a long time.

However, this apparatus to which these rotational cutters are adapted has such a problem that for the kind of food material, for example, viscous rice paste or Turkish paste, a small protrusion (i) and a cone shaped protrusion (j) like threading line are formed on the cut processed surface of food (F') as shown in FIG. 4, and especially in case of supplying the food required for solid state, it causes a serious problem.

In cutting apparatus developed by prior art, at the time of rotating each cutter and gathering its distal end ($e_0$) at one point as referred to FIG. 2, in theory, the cutting gate (g) can be completely closed so as to make a clear cutting of the bar-shaped food, but in practice, in order to work a driving system of the cutter normally, the interstice among the distal ends ($e_0$) of all cutters cannot be tightly made as "zero", but a very small interstice must be provided among these distal ends. Accordingly, remnants of the food material are to exist in this small interstice, which results in leaving a thread shaped protrusion (i) at the center on the cutting surface without being cut completely.

So far, in order to solve this problem of thread shaped protrusion, it has been tried to chamfer the edge portion of the side fringe ($e_1$) of the cutter, thereby to reduce the width of vertical plane of the fringe ($e_1$) less than the thickness of the cutter. In this method, however, a thread shaped protrusion (i) can be reduced to some degree, but it cannot be prevented completely. Accordingly, as for the particular food material, for example, like sweet bean paste with very small viscosity, a cone shaped protrusion (j) is unavboidably formed on the cutting surface as shown in FIG. 4.

In this way, the above-mentioned problem cannot be solved essentially by the prior cutting ideas. Especially, in the case of cutting food material with small viscosity, this protrusion is so remarkable that after the cutting operation, another second device for reshaping should be needed, or else manual treament is furnished to reshape the cutting surface roundly.

Therefore, the present invention hat an object to provide a method for cutting a bar-shaped food and its apparatus capable of cutting completely various bar-shaped food materials extruded sequentially without leaving any protrusion on the cutting surface as required, while making its surface roundly.

Further, another object of the present invention is to provide a bar-shaped food cutting method and its apparatus capable of cutting a bar-shaped food having core including not less than two kinds of food materials extruded sequentially as the core material to be correctly wrapped by an outer covering material, without leaving any protrusion on the cutting surface while making its surface smooth.

SUMMARY OF THE INVENTION

Generally, in order to obtain simultaneous rotation with a plurality of cutters in similar shape, which are pivotally arranged on the circumference at fixed regular intervals, at the same rotational angle in the manner such as keeping contact relation between the distal end of each cutter and the side fringe of the neighboring cutter, the side fringe should be in the shape of arc having only one positioning relation as for the rotational supporting point (hereinafter, this arc shape is referred as "basic arc"), and it is not permitted for the side fringe to be formed in any other shape than this basic arc. However, this limited condition on the cutter fringe portion is restricted on the flat plane of the rotational cutter sides planes. The prior inventors have been preoccupied so much with this limited condition that they could not find to break the plane level, namely, two-dimensional thinking. The present inventor, however, has reached the three-dimensional idea to obtain more preferable cutting, by making the fringe portion of the cutter in three-dimensions so as to satisfy the limited condition not only on the plane of X–Y axes but also to the direction of Z axis, and after a lot of trials and errors, finally he could resolve the above problem.

In the present invention, the side fringe portion of the cutter is formed in the spiral face which is made by moving straightly said basic arc to the thickness direction of the cutter and simultaneously by rotating it pivotally on the supporting point, thereby to be formed as a twisted slope which satisfies said two-dimensional limited condition, and further, the present inventor makes a device of the side fringe portion extending from the distal end of the cutter to the opposite side of the twisted slope and its making position so that the shearing edge formed as an inclined sharp edge at the end portion of the twisted slope formed in this way, that is, at the distal end of the cutter, can be arcly moved with at least one part of it exceeding one focus position where said fine interstice is generated.

Owing to this device, in the process of moving arcly the shearing edge of each cutter beyond the one focus point, each shearing edge moves contacting each other in the point at the time of passing so as to cut the thread-shaped protrusion left among the interstice completely, and additionally, in the process of the arc movement beyond the one focus point of this shearing edge, pyramid-shaped protrusion which is once formed on the head portion of the cut-off food is made round by the expansive behaviour of the food extruded when the pyramid-shaped recess portion which is generated by the combination of the twisted slope of each cutter reduces and disappears so as to squeeze and extrude the food existing in this recess portion.

BRIEF DESCRIPTION OF THE DRAWINGS

FIGS. 14 to 19 include respectively a set of a plan view in every step of the movement of this cutter, a horizontal section view on the level of the pressing portion at the same time and a longitudinal section view taken along each line.

FIGS. 20 to 22 are partly vertical-section views explaining the shape of the clinch and squeeze fringe portion in transformed examples of this cutter.

FIGS. 25 to 28 include respectively a set of a plan view in every step of the movement of this cutter and a horizontal section view on the level of the pressing portion at the same time.

FIG. 31 is an enlarged perspective view explaining the shape of the fourth embodiment cutter according to the present invention.

DESCRIPTION OF THE PREFERRED EMBODIMENTS

The present invention is to improve shape of cutters in a bar-shaped food cutting apparatus. First of all, the shape of a cutter in the first embodiment and a method for cutting bar-shaped food according to the cutter of the first embodiment will be explained with reference to FIGS. 5 to 19, and succeedingly, forms of cutters in the second to the fourth embodiments will be explained with reference to FIGS. 23 to 31, and finally the whole apparatus for cutting bar-shaped food will be described with reference to FIG. 34.

CUTTER OF THE FIRST EMBODIMENT

Figure 5:
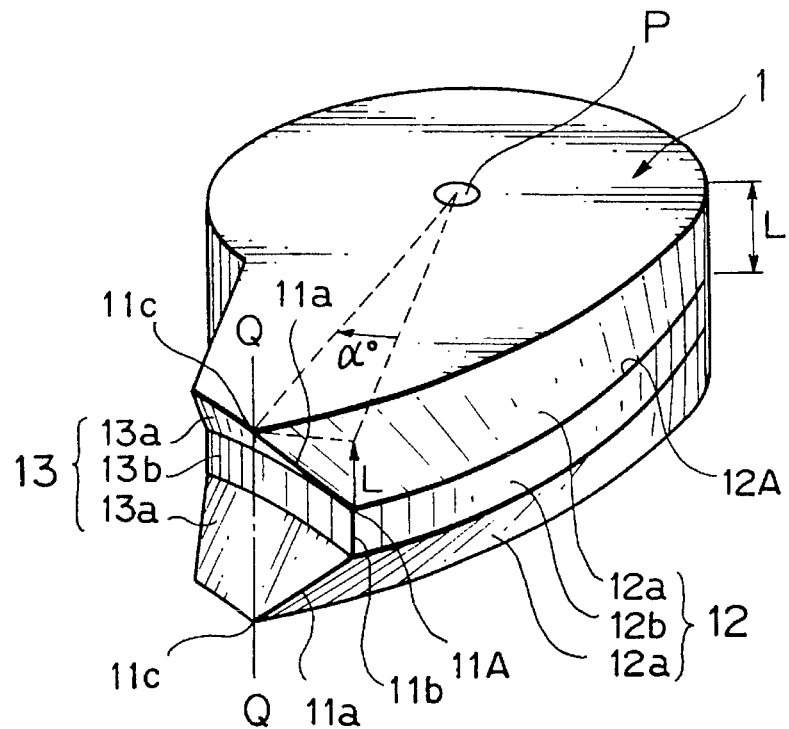
FIG. 5 is an enlarged perspective view showing the shape of a cutter of the first embodiment according to the present invention.

In FIG. 5, numeral (1) indicates a cutter of the first embodiment. This cutter (1) has a predetermined thickness, and on this thick face, inclined shearing edges (11a) to perform cut-off operation are formed, and also a vertical edge (11b) is formed at the distal end portion thereof. Clinch and squeeze fringe portion (12) for performing constricting and shaping operation is formed on one side of a fringe portion of the cutter, which portion extends from these shearing edges (11a) and the vertical edge (11b) to the side of supporting point (P). On the other side of the fringe portion thereof extending from these shearing edges (11a) and the vertical edge (11b) to the supporting point (P), a permissible groove (13) for permitting this clinch and squeeze fringe portion (12) of the neighbouring cutter to move there is formed.

Figure 6:
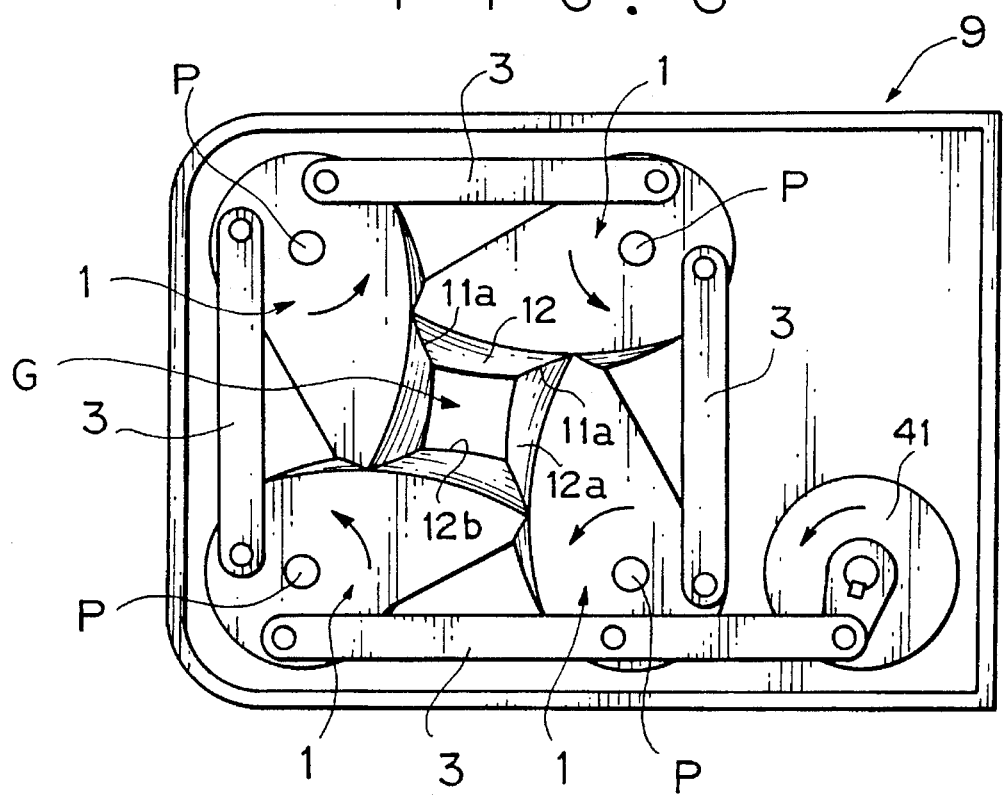
FIG. 6 is a schematic top view illustrating cutting system portion including above cutters.
Figure 7:
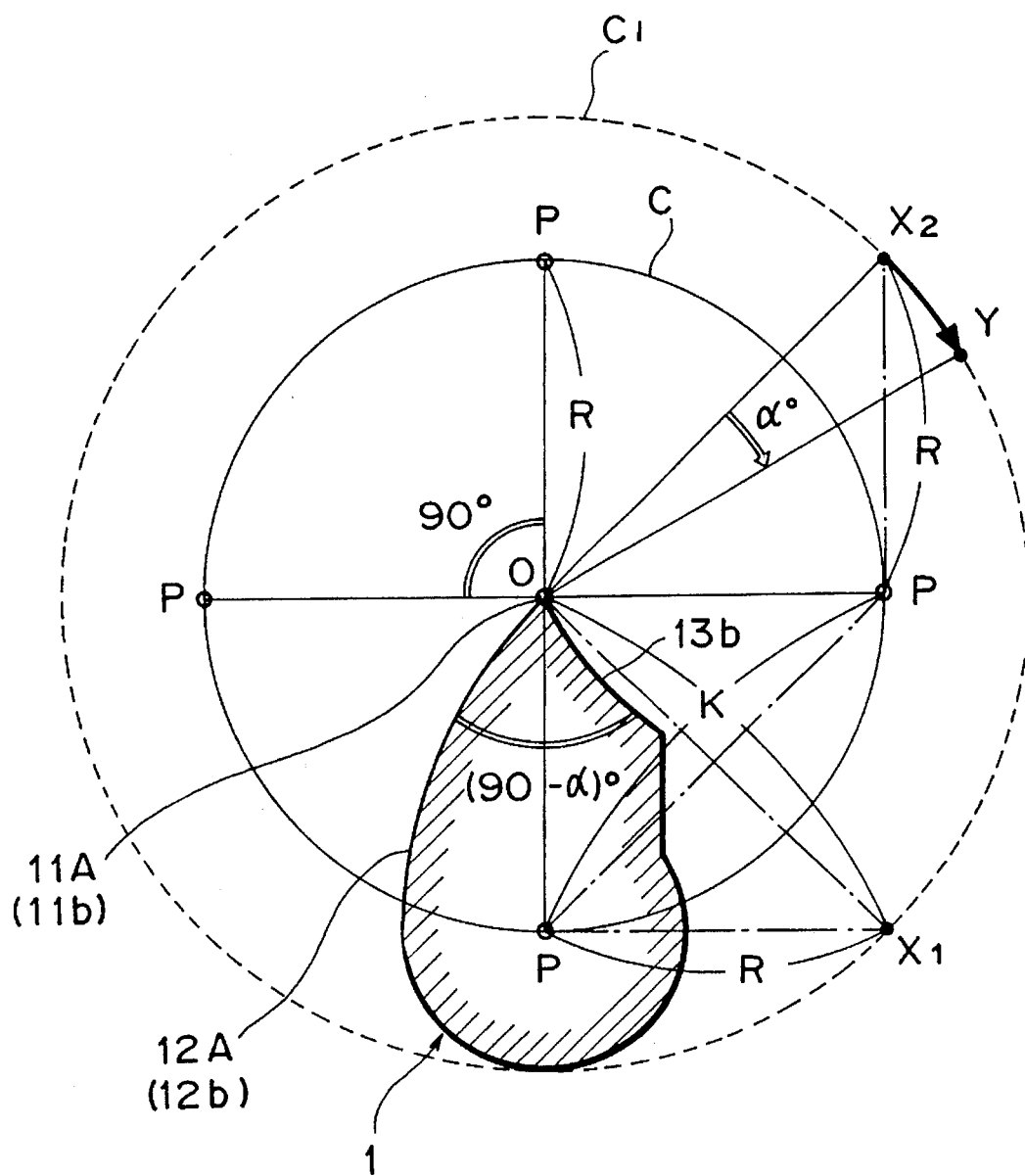
FIG. 7 is a horizontal sectional view on the pressing portion in order to explain the basic arc of this cutter.

As shown in FIGS. 6 and 7, four pieces of cutters in this embodiment are pivotally arranged with four points as supporting points (P) which are positioned at regular intervals on the circumference (C) having a center (O) and a radius (R), so that the shearing edges (11a) and vertical edge (11b) of each cutter can move slidably on the clinch and squeeze fringe portion (12) of its neighbouring cutter, and a shaping cut gate (G) enclosed by four clinch and squeeze fringe portions (12) is established in the inside of each cutter (1). The shaping cut gate (G) is opened and closed, or magnified and reduced in response to the synchronous rotational movement of each cutter (1), so that sequential cuttings are peformed for a bar-shaped food and it is cut at the gate (G).

The essence of the present invention lies in the shape of the clinch and squeeze fringe portion (12) for building the shaping cut gate (G) and its making position, and the shape of the permissible groove (13) for permitting this clinch and squeeze fringe (12) to move there and its making position.

First, the clinch and squeeze fringe portion (12) of the cutter (1) of this embodiment is explained.

The clinch and squeeze fringe portion (12) formed at the side fringe portion of the cutter (1) comprises a vertical belt-shaped pressing portion (12b) in the middle portion thereof and two shaping twisted surfaces (12a), each having plane symmetrical relation and holding the pressing portion (12b) therebetween upward and downward. Both of these twisted surfaces (12a) and the pressing portion (12b) are formed in the shape in accordance with the locus of a basic arc indicated by numeral (12A) in FIG. 5 by moving the basic arc (12A) in the following operation.

This basic arc (12A) as a base line is explained with reference to FIG. 7. Then, FIG. 7 is a horizontal sectional view horizontally divided at the pressing portion (12b) according to the cutter (1) of the present embodiment.

As described above, this cutter (1) is rotationally arranged with four points at regular intervals as supporting points (P) respectively positioned pivotally on the circumference (C) having a center (O) and a radius (R). Besides, in the condition such that the distance from one supporting point (P) to the next supporting point (P) is defined as (K) and further the distal end (=the vertical edge 11b) of each cutter is positioned at the above-mentioned center (O), this basic arc (12A) is to be an arc drawn with a point $(X_1)$ as a center and with a radius of (K), the point $(X_1)$ being on a temporal circle $(C_1)$ having a radius (K) from the center (O) at a distance of (R) from the supporting point (P), whereby the arc starting to extend from the above-mentioned center (O) toward the supporting point (P). The end portion of the basic arc (12A) agreeing with the center (O) is defined as a basic arc end (11A).

The basic arc (12A) obtained in this way is the special arc in the rotational cutter. In order to simultaneously rotate a plurality of similar shaped cutters pivotally arranged on the circumference at regular intervals, at the same rotational angle so that the distal end of each cutter may always slide on the fringe portion of its neighbouring cutter, the horizontal shape of the fringe portion of the cutter should be definitely in an arc shape obtained in this way. If the circumference (C) is defined where a plurality of supporting points (P) are positioned at regular intervals, its radius (R) and the shortest distance (K) between supporting points are naturally defined, so that the shape of the cutter fringe portion and its position with respect to the supporting point (P) are determined only to this basic arc (12A). The fringe portion is never formed in any other shape because if it has any other shape, contact relation between the distal end of the cutter and the fringe portion of the neighbouring cutter will be spoiled.

Though the cutter fringe portion is limited to this basic arc (12A), this limited condition of shape and position in the fringe portion is only two-dimensional one on the horizontal rotational plane surfaces of the cutter. In the present invention, the squeeze fringe portion (12) is cubically formed by making use of this basic arc (12A) also to a Z-axis direction, that is, to the three-dimensional direction.

In this embodiment, as shown in FIG. 5, the upper shaping twisted surface (12a) of the clinch and squeeze fringe portion (12) is formed in a spiral shape surface so as to conform with the locus drawn by the basic arc (12A) which is made to move upward to the vertical direction with respect to the supporting point (P) by the distance of (L) and to rotate at the angle of ($\alpha$) around the supporting point (P), and similarly, the upper shearing edge (11a) at the end portions of the cutter (1) is formed in the shape according with the locus drawn by the basic arc end (11A) which is moved in the same procedure as the basic arc (12A).

Owing to this, the shaping twisted surface (12a) is formed in an inclined twisted surface with respect to the supporting point (P), and the shearing edge (11a) on the end portion of the shaping twisted surface (12a) is also formed in an inclined shape with respect to the rotational side plane of the cutter. Accordingly, the projected position of an edge end (11c) existing on the end portion of the shearing edge (11a) on a horizontal plane (=on the rotational sides planes of the cutter) is distant from the projected position of the vertical edge (11b) on the horizontal plane (=on the rotational sides planes of the cutter) by the angle ($\alpha$) around the supporting point (P). Also, the lower shaping twisted surface (12a) and the lower shearing edge (11a) on the squeeze fringe portion (12) of the present embodiment are reversely formed on an opposite side symmetrically with the above mentioned upper shaping twisted surface (12a) and upper shearing edge (11a) respectively.

While, the pressing portion (12b) formed on the middle portion of the squeeze fringe portion (12) is established so as to conform with the locus drawn by the basic arc (12A) which is made to move straightly to the vertical direction with the supporting point (P) of the cutter (1), and it is protruded outside and curved like an arc having belt-shaped vertical plane. Besides, the vertical edge (11b) at the center of the end portion of the cutter has a shape so as to conform with the locus face which the basic arc end (11A) draws at the time of moving the basic arc (12A) straightly in the same way.

In this way, since the twisted surfaces (12a) and the pressing portion (12b) of the cutter (1) are formed with the basic arc (12A) as a base line, the plane figure limited condition of the cutter fringe portion as mentioned above is satisfied not only in the pressing portion (12b) formed as a belt-shaped vertical plane, but also in the twisted surfaces (12a) formed as inclined twisted surfaces. Therefore, even if the twisted surfaces (12a) formed as inclined twisted surfaces are sectioned horizontally at any position, horizontal sectional figure of the twisted surfaces (12a) can be conformed with the above mentioned basic arc (12A). In the cutter of prior art, inclined surface was formed by only chamfering an edge portion of the cutter fringe, with the result that the plane figure limited condition of this fringe portion was spoiled.

According to the present invention, while the cutter fringe portion (=twisted surfaces 12a) is thus formed cubically as sloped and twisted surface with the respect to the supporting point (P) that is a rotation axis of the cutter, further, an important improvement is also added to the form of the above-mentioned permissible groove (13). Namely, the permissible groove (13) is formed so as to permit the shearing edges (11a) to move arcly there in such a manner that at least one part of it exceeds the position of the center (O) (one focus position where a fine interstice exists), each of the shearing edges (11a) being formed as an inclined sharp edge at each end portion of the twisted surface (12a) formed as a twisted slope, in other words, at the distal end of the cutter.

Figure 1:
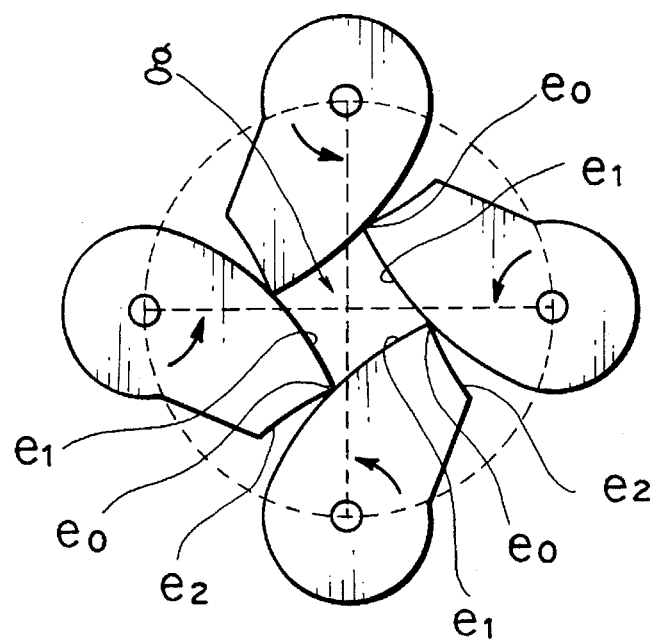
FIGS. 1 and 2 are plan views of main parts showing cutters of piror bar-shaped food cutting apparatus.
Figure 2:
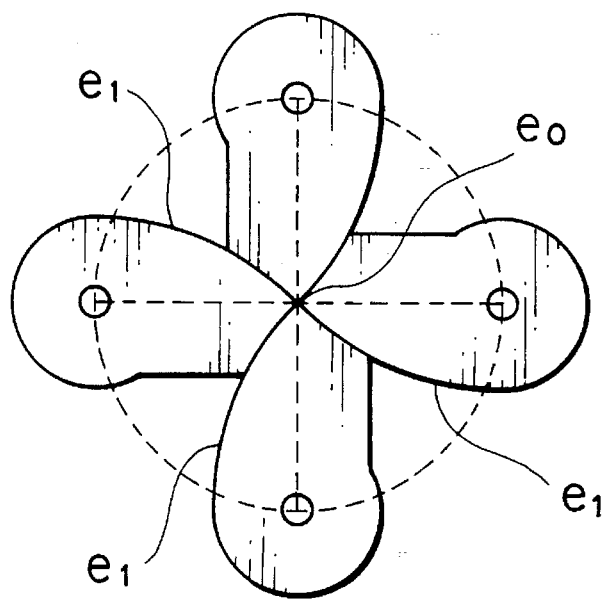
Figure 3:
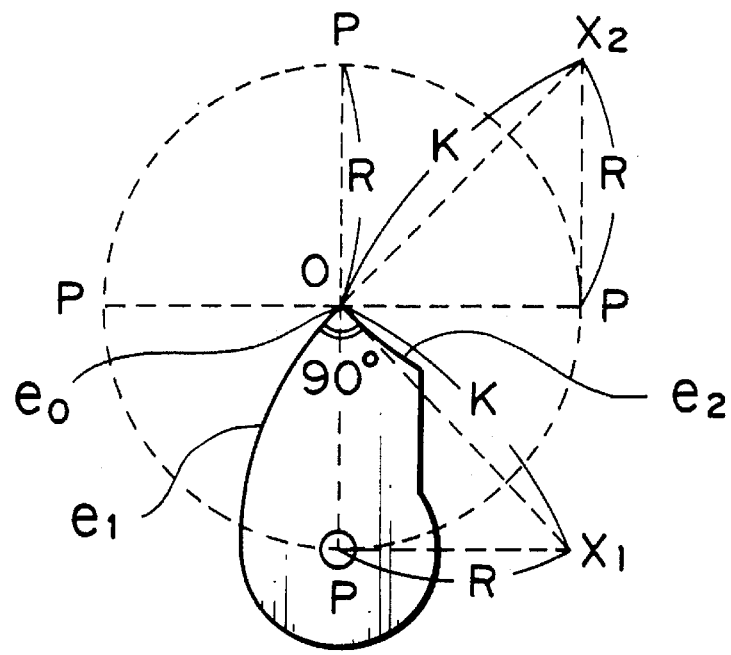
FIG. 3 is a top explanation view showing the shape of a cutter of the prior bar-shaped food cutting apparatus.
Figure 4:
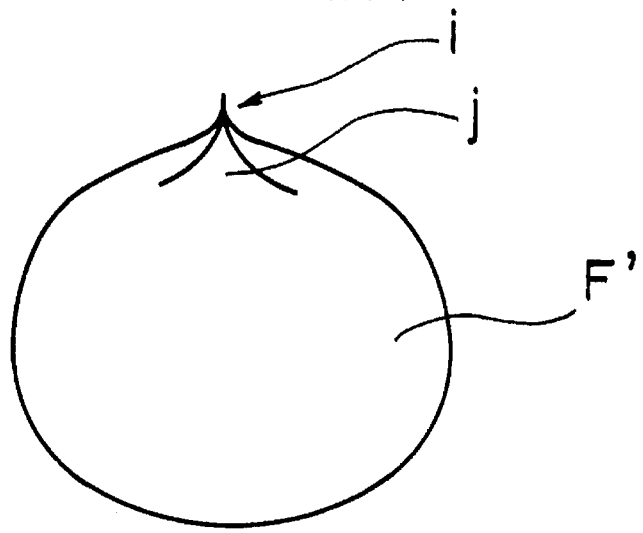
FIG. 4 is a perspective view showing the whole food shape cut by the prior cutting apparatus.

In case of prior cutter as described in FIGS. 1, 2, and 3, an angle made by one side fringe ($e_1$), corresponding to the clinch and squeeze fringe portion (12) in the present invention and the other side fringe ($e_2$), corresponding to the permissible groove (13) in the present invention, both of them performing shearing operation, is always 90° even if the cutter is horizontally sectioned at any position. The angle is defined as 90° because this case adopts a type of four pieces cutters. For example, in the case of a type of six pieces, the angle is defined as 60°. Therefore, as shown in FIG. 2, when four distal ends ($e_0$) of four pieces of cutters are gathered at one point, the side fringe ($e_1$) of each cutter is firmly abutted on the side fringe ($e_2$) of its neighbouring cutter without any interstice and a piece of sequential flat plane is respectively formed on the both sides planes by four cutters, thereby to stop the rotation of each cutter. That is unavoidable in the prior cutter, since all the operation of cutting food is finished at this time when the distal ends ($e_0$) of cutters are gathered at the center (O), a food material is left like a thread between fine interstice generated by each distal end of cutters.

Then, in the cutter of the present invention, the angle made by said squeeze fringe portion (12) and permissible groove (13) on the horizontal plane is defined as 90° or less, so that the distal end of each cutter (=shearing edges 11a) may pass the focus position (=the center position O).

As mentioned above, the shearing edge (11a) is formed as a locus line at the time of moving spirally the basic arc end (11A) around the supporting point (P). Accordingly, this shearing edge (11a) is constituted in that many basic arc ends (11A) are succeedingly in series on the spiral line with the supporting point (P) as an axis. The present invention is constructed in that these many basic arc ends (11A) forming the distal end portion of the cutter pass the one focus position (=the position of the center O) sequentially according to the rotation of the cutter by defining the horizontal angle made by the squeeze fringe portion (12) and the permissible groove (13) as 90° or less. As described above, the shearing edge (11a) is formed in a sharp-edged cutter. Therefore, according to the cutter of the present invention, inclined sharp-edged cutters (=the shearing edges 11a) on the distal end of each cutter perform an arc movement such as exceeding the one focus position (=the position of the center O), and in the process of this arc movement, the inclined sharp-edged cutters (=the shearing edges 11a) completely cut off the thread shaped small protrusion left between the interstice at the root by changing their point contact position (=individual basic arc ends 11A) and rubbing together each other.

Hereinafter, in the cutter of the present embodiment, the shape of the permissible groove (13) and the position where it is formed will be specifically explained.

As shown in FIG. 5, the permissible groove (13) of the present embodiment cutter (1) is formed in such a groove shape as permitting said squeeze fringe portion (12), of which middle portion is protruded (pressing portion 12b), to move there when each cutter is rotated at once combined with each other, and it comprises a groove bottom portion (13b), that is the bottom portion of the groove, and two groove side surfaces (13a), both being in symmetrical relation on each face, holding the groove bottom portion (13b) therebetween upward and downward.

Further, this permissible groove (13) is formed in the shape so as to conform with the shape made by the squeeze fringe portion (12) whose whole component surface being rotationally moved to the next supporting point (P) with a vertical line (Q) as a rotational axis, which line links with the edge ends (11c) of the shearing edge portions (11a), by the angle made by the supporting point (P) and its neighbouring supporting point (P) at the center (O), and in the present embodiment, it is 90° because of four pieces-typed cutter.

In the present embodiment, since the permissible groove (13) is formed in this way, the angle made by the groove side surface (13a) and said shaping twisted surface (12a) is varied respectively on every following horizontal plane. Namely, on the level of the edge ends (11c), that is, on the both sides planes of the cutter, the angle made by the two is 90°, and on the level of the groove bottom portion (13b) and the pressing portion (12b), the angle formed by the two is (90−α)° on the horizontal plane. As for the other horizontal planes therebetween, the angle made by the two on the horizontal plane is diminished successively from 90° to (90−α)° according as it is from the level of the both sides planes of said cutter to the level of the portion contacting the end portion of the groove bottom (13b) and pressing portion (12b). Then, the angle made by the groove bottom portion (13b) and the pressing portion (12b) on the level of the vertical edge (11b) is (90−α)° on the horizontal plane as shown in FIG. 7.

In the cutter of the present embodiment, it is on the level of the shearing edges (11a) and the vertical edge (11b) except the edge ends (11c) that the horizontal angle made by the squeeze fringe portion (12) and the permissible groove (13) is defined as less than 90°. In the edge ends (11c) existing on the sides planes of the cutter, this angle is defined as 90°. That is to say, in the cutter (1) of the present embodiment, it is the shearing edges (11a) except the portion of the edge ends (11c) that cut off the thread shaped protrusion beyond the focus position (=the position of the center O).

More specifically, this is explained as follows. As described above, since the permissible groove (13) of this cutter (1) has the shape made by moving rotationally the whole component surfaces of the squeeze fringe portion (12) at the angle of 90° with the vertical line (Q), linking with the edge ends (11c) not but the vertical edge (11b), as a rotation axis, the groove bottom portion (13b) is formed in the belt-shaped vertical plane which is based on the arc figure having as a radius (K) and as a center (Y) to be found at the position moved to the side of the adjacent supporting point (P) by the angle (α), taking the center (O) as a reference point, from ($X_2$) which is defined at the position that is on the temporal circle ($C_1$) with a center (O) and a radius (K) and distant from the next supporting point (P) by (R), as shown in FIG. 7. Therefore, the horizontal angle made by the squeeze fringe portion (12) (=the pressing portion 12b) and the permissible groove (13) (=the groove bottom portion 13b) on the level of the vertical edge (11b) is defined as (90−α)°. While, as shown in FIG. 3, in the case of the side fringe ($e_2$) in the prior cutter, since it is formed in the belt-shaped vertical plane which is based on the figure of the arc having the above mentioned ($X_2$) as a center and (K) as a radius, the horizontal angle made by the side fringe ($e_1$) and ($e_2$) on the level of the distal end ($e_0$) is 90°.

Figure 17A:
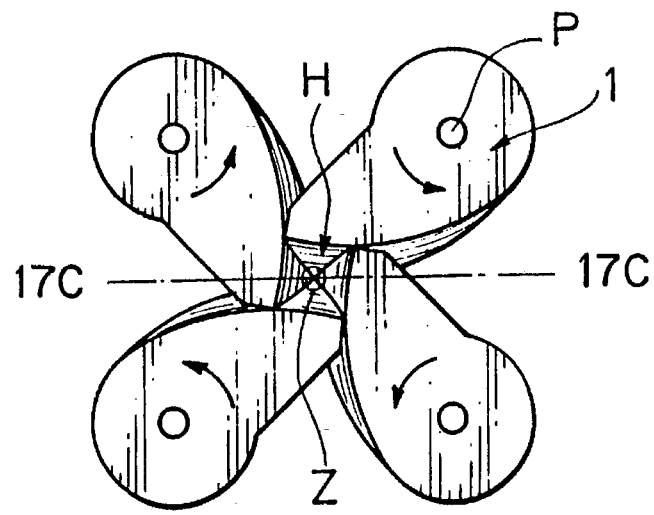
Figure 17B:
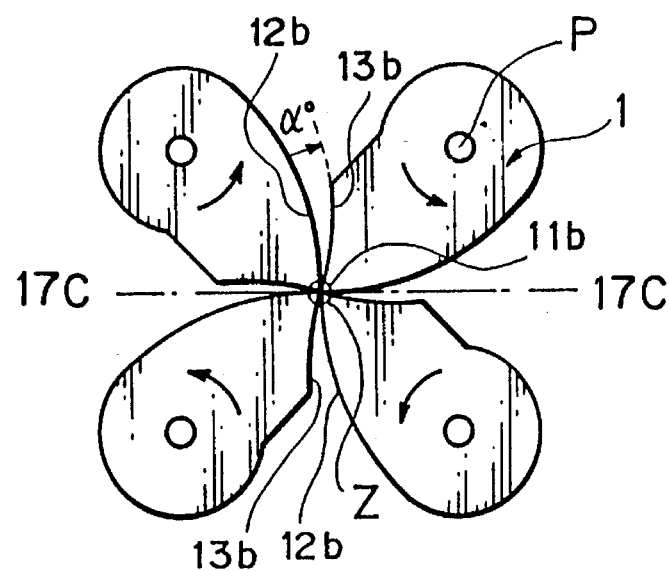
Figure 17C:
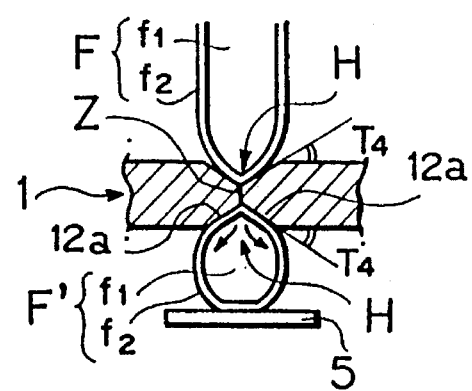

In this way, in the cutter (1) of the present embodiment, since the horizontal angle made by the pressing portion (12b) and the groove bottom portion (13b) is defined as (90−α)°, as shown in the horizontal section view of FIG. 17, when the vertical edges (11b) are gathered at the position of the center (O), each space having the angle of (α) is generated between the pressing portion (12b) of each cutter and the groove bottom portion (13b) of its neighbouring cutter, so that the vertical edge (11b) and the end portions of the shearing edges (11a) abutting on the vertical edge (11b) move arcly beyond the center (O) without stopping the rotational movement of all the cutters.

Figure 19A:
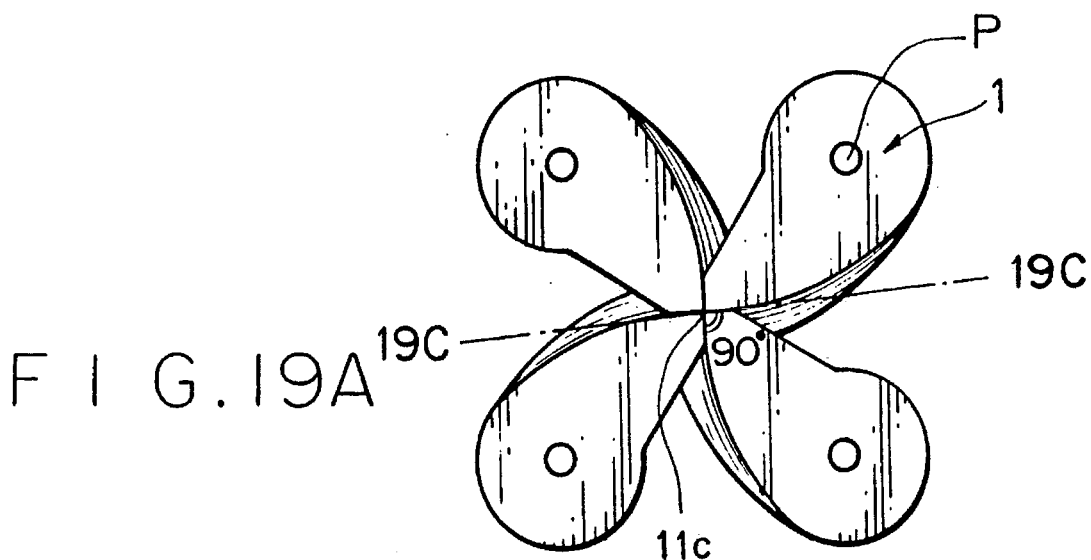
Figure 19B:
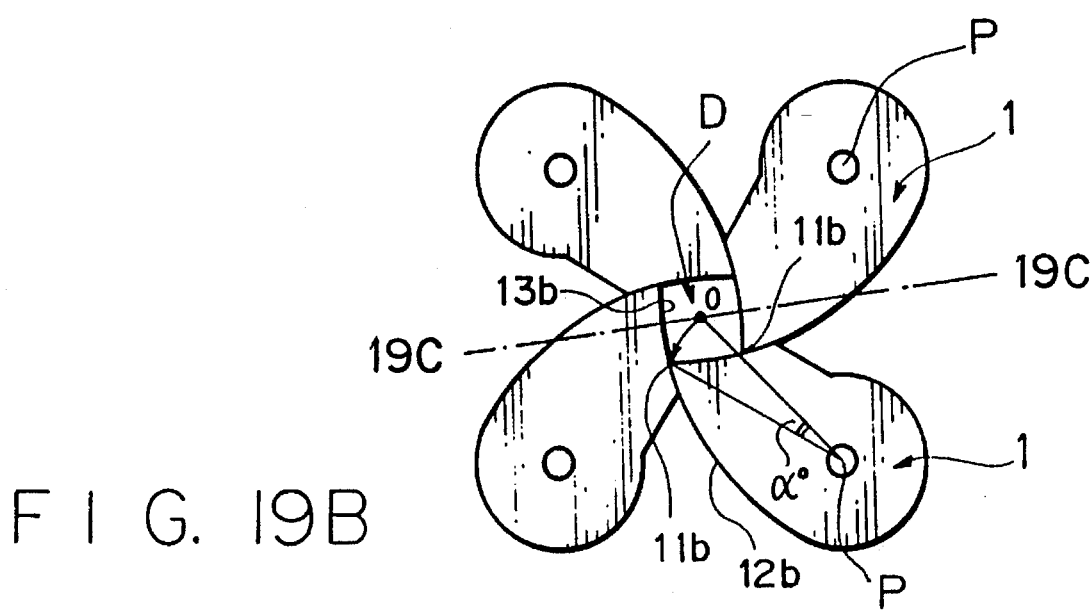
Figure 19C:
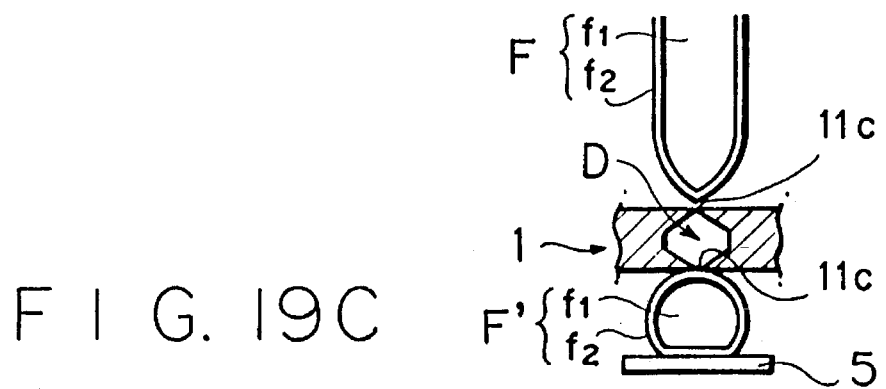
Figure 23:
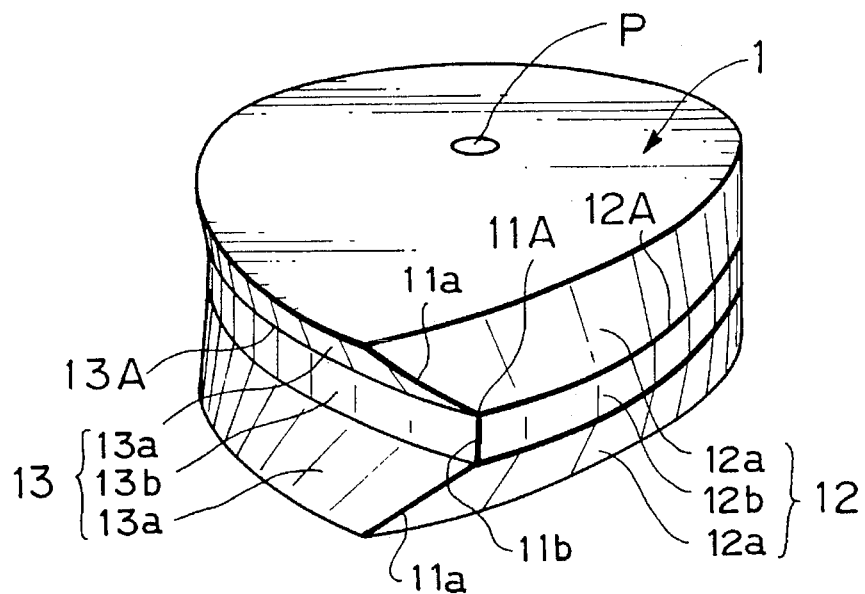
FIG. 23 is an enlarged perspective view explaining the shape of the second embodiment cutter according to the present invention.

And, as shown in the horizontal section view of FIG. 19, at the first time when each cutter is further rotated so as to move the vertical edge (11b) and the end portions of the shearing edges (11a) abutting on the vertical edge (11b) arcly beyond the center (O) by the angle (α), the pressing portion (12b) of each cutter and the groove bottom portion (13b) of the neighbouring cutter are firmly abutted each other without any space, thereby to stop the rotational movement of each cutter.

When the vertical edge (11b) moves arcly beyond the center (O) by the angle (α) to stop the rotational movement, at this time, as shown in the horizontal section view and the longitudinal section view at the line ($S_6$—$S_6$) of FIG. 19, the space (D) enclosed by four permissible grooves (13) is generated around the center (O). However, this space (D) does not disturb the cutting operation of bar-shaped food. Because, at this time, as shown in the plan view of FIG. 19, the end portions (11c) existing on the sides planes of the cutter (1) are gathered at the center (O) to form respectively a piece of sequential flat face by four sides planes of four cutters.

As mentioned above, this is because the position of the vertical edge (11b) is deviated from the position of the edge ends (11c) by the angle (α) with respect to the supporting point (P) on the cutter rotational sides planes, and when the vertical edge (11b) moves arcly beyond the center (O) by the angle (α), the edge ends (11c) exist at the position deviated from the vertical edge (11b) by the angle (α), that is, at the position of the center (O). Further, this is because in the present embodiment, the permissible groove (13) is constituted so as to conform with such a shape as turning the whole component surfaces of the squeeze fringe portion (12) by the angle 90° around the vertical line (Q) linking with the edge ends (11c), thereby that the horizontal angle on the distal end of the cutter is 90° on the level of the edge ends (11c).

Or, in the cutter of the present embodiment, if this permissible groove (13) is formed so as to conform with such a shape as turning the squeeze fringe portion (12) by smaller angle than 90° (for example, 85°) around the vertical line (Q) toward the next supporting point (P), the horizontal angle on the distal end of the cutter is less than 90° (85°) on the level of the edge ends (11c). Sequentially, these edge ends (11c) also move arcly beyond the center (O) (by the angle 5°) and the whole shearing edges (11a) including the edge ends (11c) perform the cutting operation. However, in this case, sequential flat plane is not formed by four sides planes of four cutters.

The cutter (1) of the present embodiment, constituted in the above mentioned manner, makes it possible to cut a bar-shaped food (F) consisting of various kinds of food materials in the shaping cut gate (G) generated by four pieces of this cutter (1) combined with each other. Hereinafter, with reference to FIGS. 8 to 19, the method for cutting bar-shaped food according to the cutter (1) of the present embodiment will be explained in detail.

FIGS. 8 to 13 are partial inspective views showing six steps from state I to state VI in which the shaping cut gate (G) is being diminished and closed, and succeedingly a top head shaping area (H) described later is being diminished and disappeared according as each cutter is rotated counterclockwise, and they are illustrated with one piece of cutter especially omitted. Then, in FIGS. 14 to 19, a set of a plan view of each cutter, a horizontal section view on the level of the pressing portion (12b) of each cutter at the same time and a longitudinal section view taken along each indicated line, for example, ($S_1$—$S_1$), at the same time is illustrated in every step from state I to state VI. Only the longitudinal section view of the cutter taken along each indicated line shows bar-shaped food (F).

CUTTING OPERATION PROCESS

By the cutting and shaping operation largely classified in the three steps, it becomes possible for the cutter of the first embodiment to cut the bar-shaped food (F) having core consisting of not less than two kinds of food materials such as core material ($f_1$) and outer covering material ($f_2$) without exposing this core material ($f_1$) over the outer covering material ($f_2$), without leaving any thread-shaped protrusion on the cutting surface and while making its surface round. "Clinching and constricting operation" in the first step is performed during State I to State IV illustrated in FIGS. 8 to 11 and FIGS. 14 to 17, and "cut-off operation" in the second step and "squeezing and pushing operation" in the third step are performed during State IV to State VI illustrated in FIGS. 11 to 13 and FIGS. 17 to 19.

① First Step; Clinching and Constricting Operation

Figure 8:
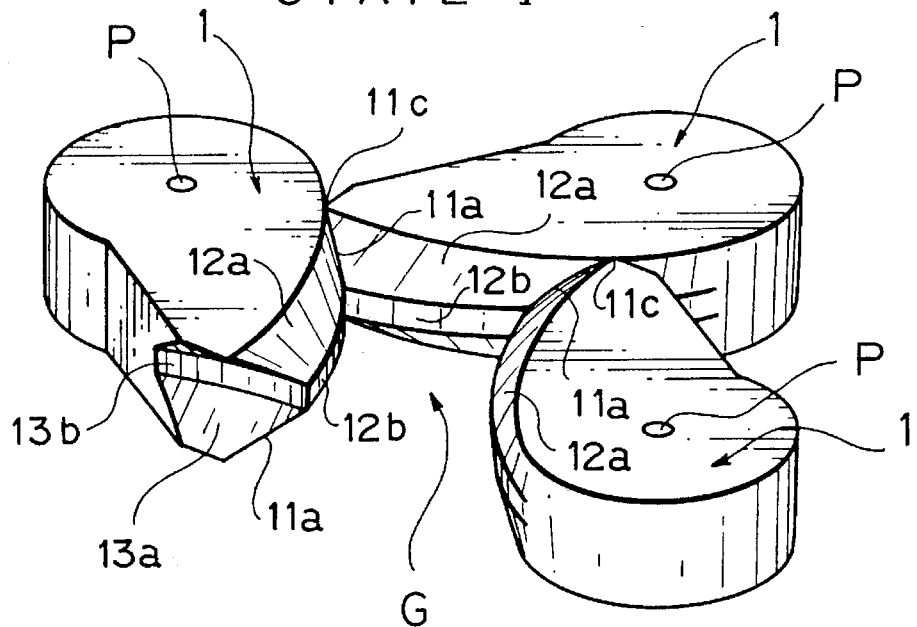
FIGS. 8 to 13 are partly inspective views, each showing the movement of this cutter in every step.
Figure 9:
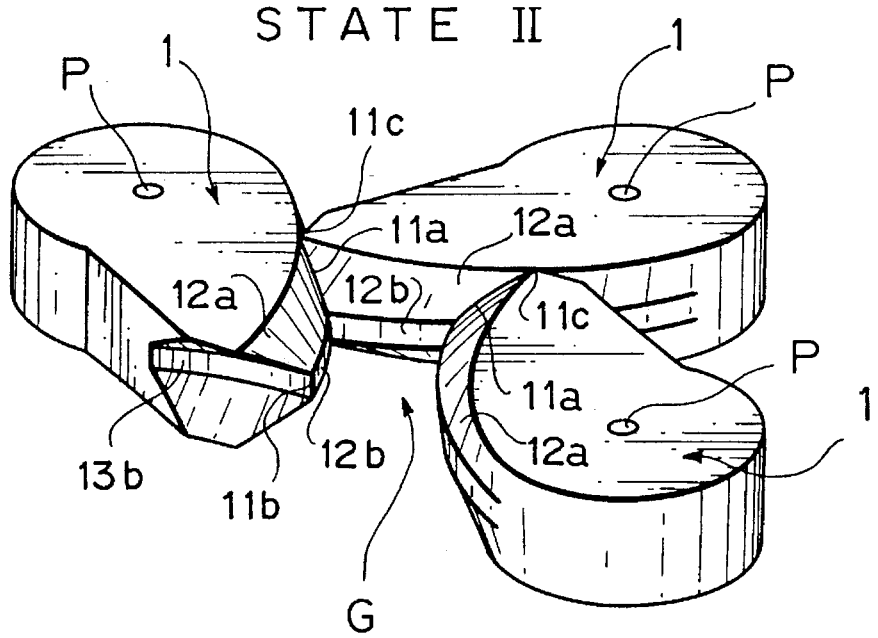
Figure 10:
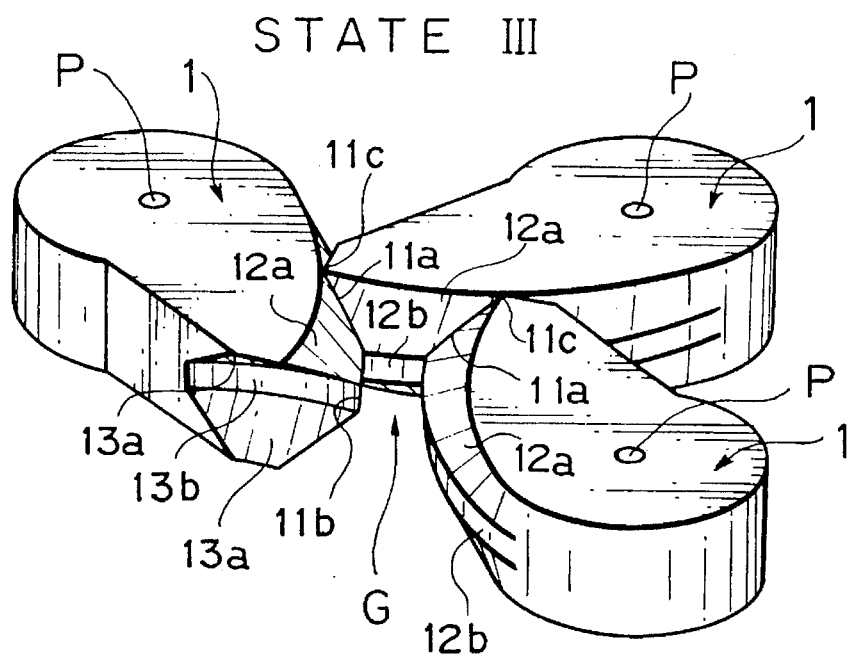

State I shown in FIG. 14 and FIG. 8 indicates the state in which the shaping cut gate (G) is opened at maximum. At this time, bar-shaped food (F) having core is introduced into the shaping cut gate (G), and between this State I and State IV indicated in FIG. 17 and FIG. 11, while the shearing edges (11a) and the vertical edge (11b) of each cutter slidably move on the squeeze fringe portion (12) of the neighbouring cutter, every cutter rotates counterclockwise at once so as to diminish the shaping cut gate (G) gradually, thereby clinching and constricting the bar-shaped food (F) having core. As indicated in each vertical section view taken along the line ($S_1$—$S_1$, etc.) of FIGS. 14 to 17, in the process of decreasing the shaping cut gate (G), mainly the pressing portion (12b) of each cutter flatly presses the bar-shaped food (F) having core with its belt-shaped vertical plane and clinch and constrict the portion around the bar-shaped food (F) such as to be pushed from all sides. In this way, in the cutter of the first embodiment, since the pressing portion (12b) having a belt-shaped vertical plane is provided in the middle of the squeeze fringe portion (12), it is possible to press the portion around the bar-shaped food (F) having core by the flat plane thereof, with the result that it is also possible to clinch and constrict the bar-shaped food (F) having core without exposing the core material ($f_1$) to the surface of the outer covering material ($f_2$).

Further, during this first step (State I to State IV), the pressing portion (12b) performs a clinching and constricting operation to the bar-shaped food (F), and in addition to this, the twisted surface (12a) performs "rubbing and shaping operation" simultaneously. The portion clinched and constricted by the pressing portion (12b) is rubbed by the shaping twisted surface (12a) to be shaped fine. As mentioned above, since this twisted surface (12a) is formed in a twisted slope shape by moving the basic arc (12A) to the vertical direction of the supporting point (P) as well as rotating it around the supporting point (P), inclination of the slope on the shaping twisted surface (12a) is gradually decreased according as it goes from the side of the supporting point (P) to the side of the shearing edge (11a). This inclination change of the twisted surface (12a) plays an important role.

Namely, as indicated by reference numbers ($T_1$) to ($T_4$) of the longitudinal section views taken along each indicated line ($S_1$—$S_1$, etc.) in FIGS. 14 to 17, since the inclination of the twisted surface (12a) contacting the bar-shaped food (F) having core is gradually decreased according as the pressing portion (12b) is going to press the food by its plane, the twisted surface (12a) serves to rub the portion clinched and constricted by the pressing portion (12b) to be shaped roundly, and further it works in a manner such as drawing the outer covering material ($f_2$) of the bar-shaped food (F) having core into the center portion of the core material ($f_1$), thereby helping to cut the covering material of bar-shaped food (F) having core.

As shown in the horizontal section view of FIG. 17, "clinching and constricting operation" in the first step as mentioned above is completed at the time of State IV when the shaping cut gate (G) is completely closed, that is, when every vertical edge (11b) of each cutter which was moving slidably on the pressing portion (12b) of the neighbouring cutter so far is gathered at the center (O) (gathering portion Z). However, as mentioned above, a minute interstice is generated unavoidably at this gathering portion (Z). In prior art, at the time when every distal end of the cutters was gathered at one point, all cutting operation was completed and at once it continued to the opening operation of the cutting gate, so that thread-shaped food left between the minute interstice was left as a small protrusion on the center of the cutting surface without being completely cut. In the cutter (1) of the present invention, cutting operation is not completed at this time of State IV when every vertical edge (11b) is gathered at one point, but each cutter (1) continues to rotate to the same direction, so that the cut-off operation in the second step as follows is performed for the thread-shaped food left between the interstice.

② A Second Step; Cut-off Operation

Figure 11:
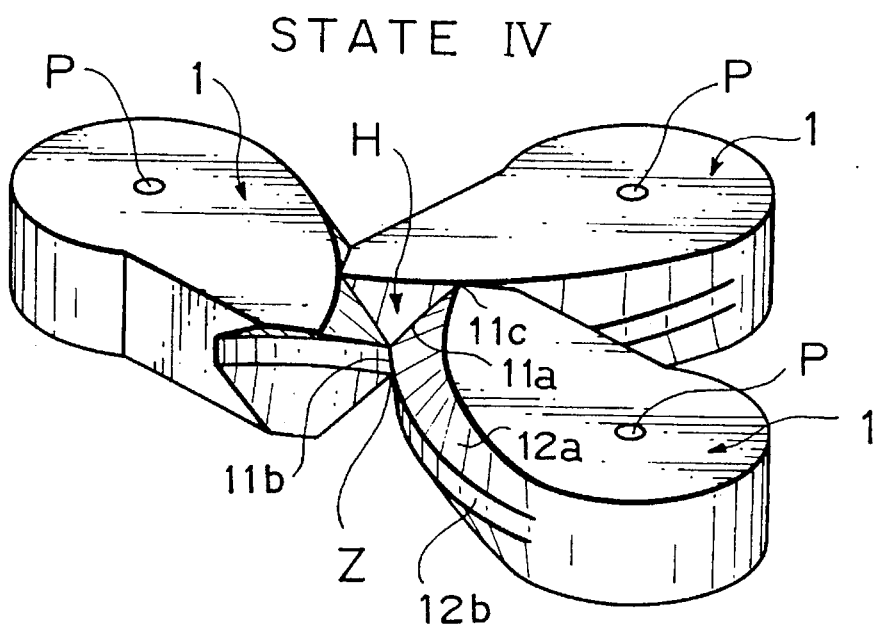
Figure 12:
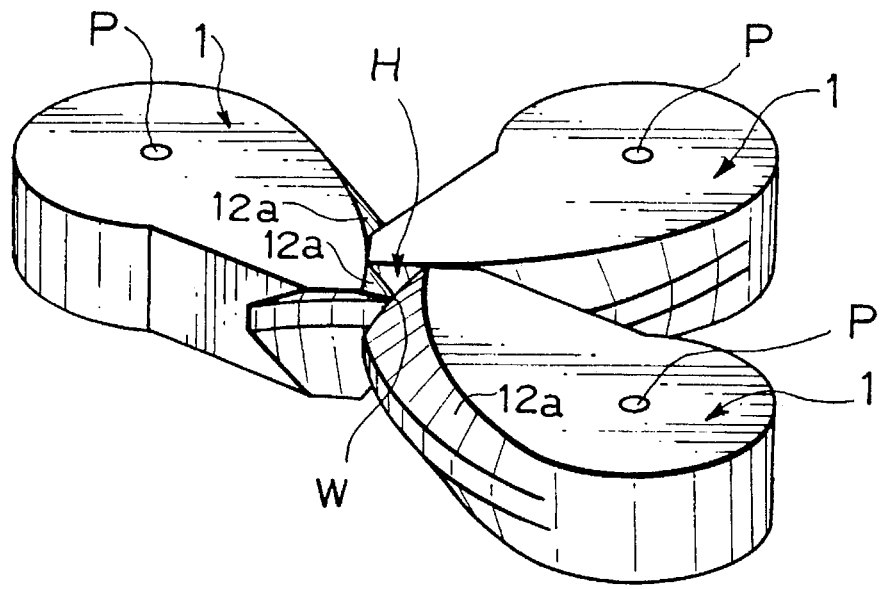

By further rotating each cutter to the same direction from State IV indicated in FIG. 17 and FIG. 11, every vertical edge (11b) gathered at the gathering portion (Z) starts to part each other, referring to the horizontal section view of FIG. 18, and this time, each one focus point is achieved on the level of each shearing edge (11a). For example, in State V indicated in FIG. 18 and FIG. 12, one focus point is achieved at the point indicated by reference (W) on the shearing edges (11a). The cutter of the present invention cuts off the food left among the tiny interstice by one focus point (gathering point W) on the level of each shearing edge (11a). Namely, since each shearing edge (11a) is formed in a twisted shape as mentioned above, it takes the shape of an inclined sharp edge against the cutter rotational sides planes. According to the rotation of cutters, these four shearing edges (11a) keeping in the twisted positional relation each other, and moving arcly in point contact each other, cut off the food left in the thread shape like the sharpest cutter.

Additionally, one focus point on the level of the shearing edges (11a) performing cut-off operation in this way moves up and down along the vertical line passing through the center (O) according to the rotation of the cutter. As shown in the longitudinal section view taken along the line (S₆—S₆) of FIG. 19, in State VI, both one focus points are achieved respectively on the level of said edge ends (11c), and both one focus points on the level of these edge ends (11c) are respectively on the positions moved upward and downward from the positions of said gathering points (W) along the vertical line passing through the center (O). The up and down movement of this gathering point serves to cut off the thread-shaped food fine and steady.

Figure 13:
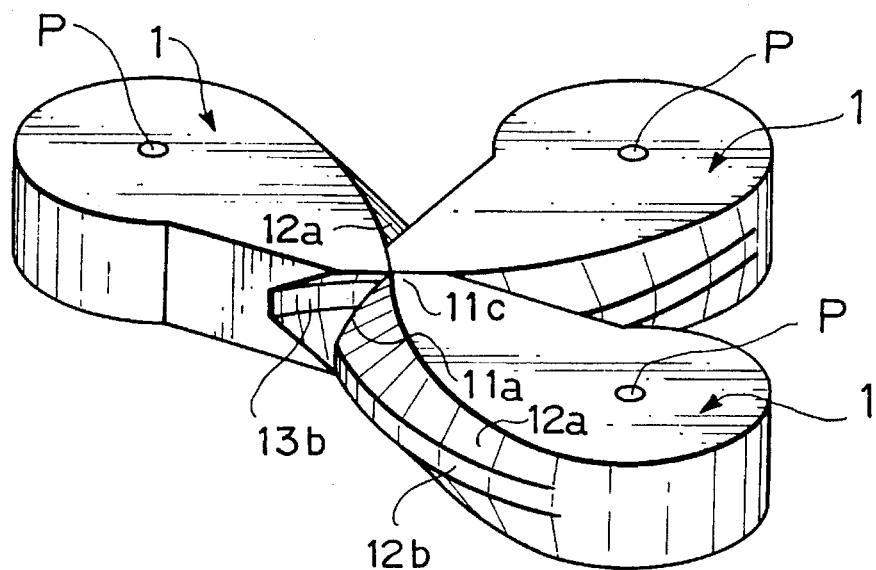
Figure 16A:
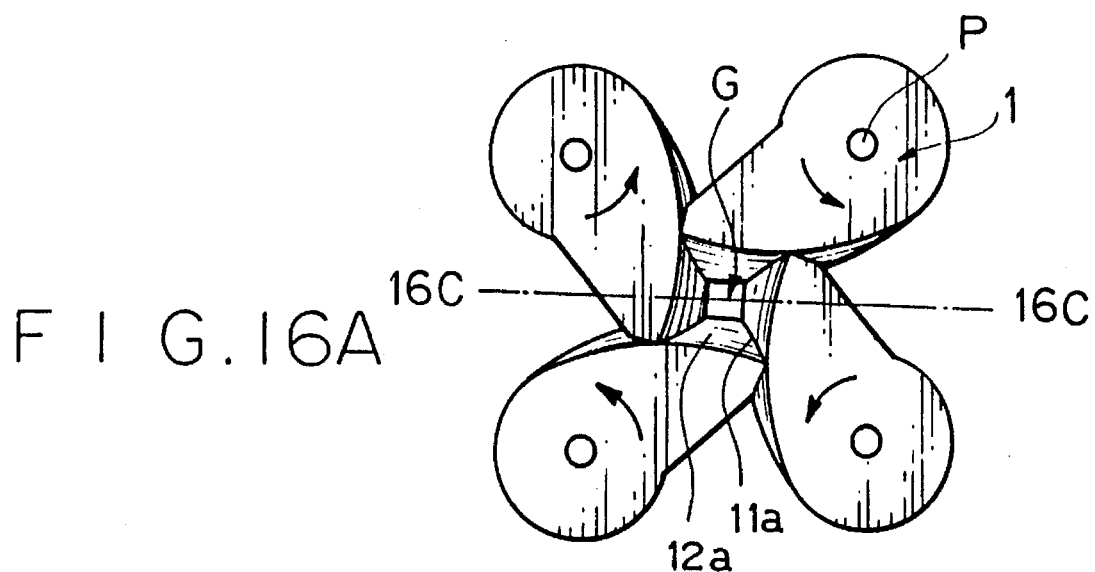
Figure 16B:
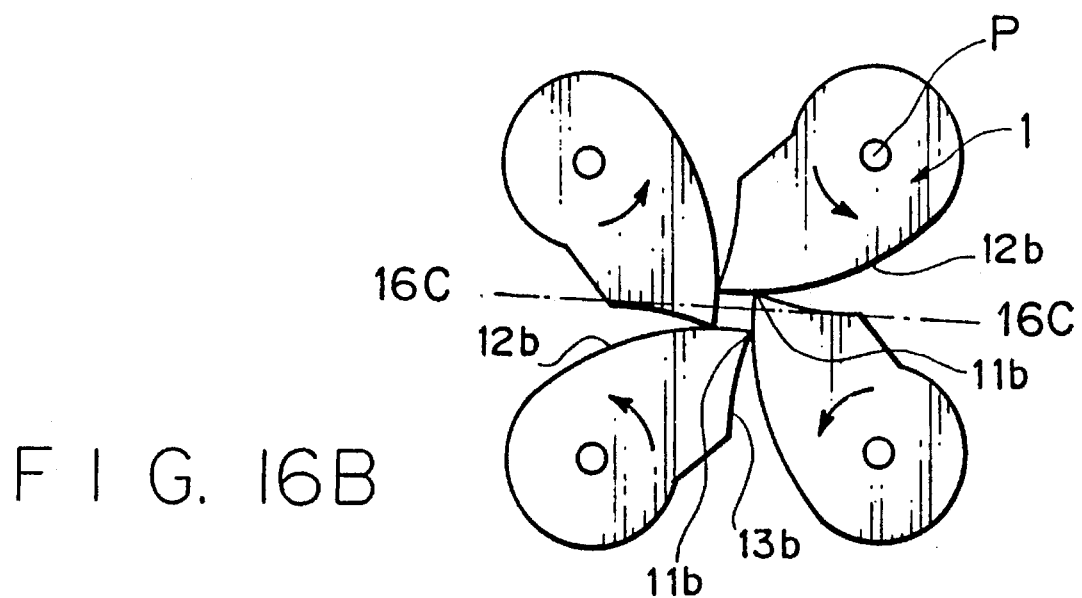
Figure 16C:
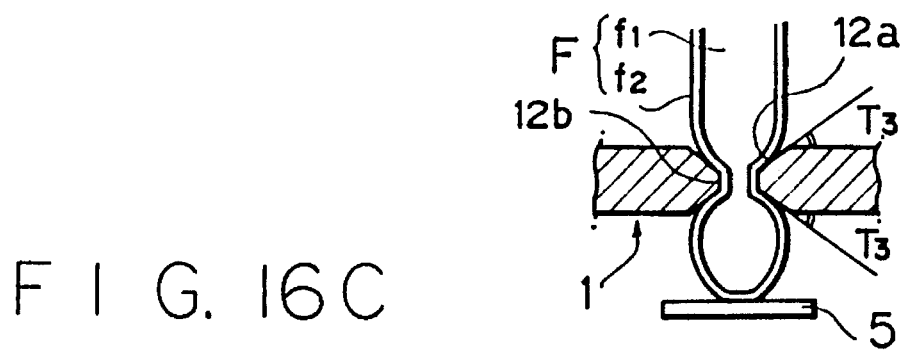

"Cut-off operation" in the second step according to the cutter (1) of this embodiment is completed at the time of State VI illustrated in FIG. 19 and FIG. 13, that is, when the edge ends (11c) are gathering at one point. At this time, each vertical edge (11b) reaches the position beyond the center (O) by the angle of (α) as shown in the horizontal section view of FIG. 19, and the squeeze fringe portion (12) of each cutter is firmly abutted with the permissible groove (13) of its neighbouring cutter, so as to stop the rotation of the cutters.

Moreover, at this time of State VI, a piece of sequential plane surface is formed respectively on the top and bottom sides planes of four cutters. This is because the top head shaping area (H) as described later, which is generated by the shaping twisted surface (12a) of each cutter at the time of State IV illustrated in FIG. 17 and FIG. 11, is gradually diminished according to the rotation of the cutter, and further, it disappears completely at the time of this State VI.

During State IV to State VI, this top head shaping area (H) is formed in a recess of almost square cone shape respectively on the top and bottom side surfaces of each cutter by engaging four shaping twisted surfaces (12a) each other on the portions near the gathering point (near the center O) (refer to FIG. 11). However, in FIG. 11, only the top head shaping area (H) on the top side surface is illustrated. For example, in State V illustrated in FIG. 18 and FIG. 12, the top head shaping area (H) is formed as an almost square shaped recess with said gathering point (W) as a vertex. And the top head shaping area (H) is gradually decreased in volume according as cutters are rotated further. This invention makes the best use of the volume decrease in this top head shaping area (H), thereby realizing the spherical shaping of the food top portion as mentioned later.

③ Third Step; Squeezing and Pushing Operation

"Squeezing and pushing operation" in the third step is performed during State IV to State VI simultaneously with the "cut-off operation" in the second step as described above. Together with the point contacting arc movement of said shearing edges (11a), said top head shaping area (H) is also decreased. And, in the process of decreasing this top head shaping area (H), fined materials existing in an almost square cone-shaped top head shaping area (H) are squeezed therearound and pushed away respectively to the upward and downward direction, thereby shaping the cutting surface of the cut-off food spherically.

Namely, as indicated in the longitudinal section views taken along each line (S₄—S₄ line, etc.) of FIGS. 17 to 19, according as the top head shaping area (H) is decreased, food materials existing in the top head shaping area (H) are squeezed from all sides and pressed by the slopes of the shaping twisted surfaces (12a), with the result that the food is squeezed and pushed away to the direction of the cut-off food (F'). At this time, a conveyer (5) as described later supports the cut-off food (F') from below. Owing to this, food material squeezed away to the side of cut-off food (F') is not only pushed away downward, but also it flows to the inside of the cut-off food (F') (indicated by "bold arrow" in the longitudinal section views of FIGS. 17 and 18).

As a result, the cut-off food (F') is expanded to the circumferencial direction by the quantity of the food material squeezed away from the top head shaping area (H) and this expansive behaviour of the food by the squeeze and push serves to shape spherically the almost square cone-shaped protrusion (j) (refer to FIG. 3) formed on the food top surface at the time of State IV of FIG. 17.

In this way, "squeezing and pushing operation" in the third step is to press the cone-shaped protrusion on the top head portion of the food such as to be shaped round. It is remarkably important for the present invention to perform the pressing operation of the cone-shaped protrusion by the horizontal transfer of the twisted surfaces (12a) in twisted slopes. Differently from the second shaping operation by the prior stamping process such as pressing the food from upside, in the method, the whole food is not compressed to be overly flat, and the outer covering material ($f_2$) can be effectively drawn into the food top head portion because each slope of the twisted surfaces (12a) horizontally transfer to the direction of the center (O), contacting the food material (=outer covering material $f_2$).

In other words, in the process of decreasing the top head shaping area (H), simultaneously with squeezing and pushing the food material existing in the top head shaping area (H), outer covering material ($f_2$) or surface portion of the outer covering material ($f_2$) in contact with the shaping twisted surfaces (12a) is drawn into the top head portion from the circumference of the cut-off food (F'). Owing to this drawing action, such a phenomenon disappears that outer covering material near the top head portion of wraparound food becomes thin in the prior wraparound cutting process of bar-shaped food having core, and it becomes possible to cut off equally the bar-shaped food (F) having core in which outer covering material ($f_2$) equally wraps the core material ($f_1$).

The performance of "squeezing and pushing operation" in the third step and "outer cover food drawing action" accompanied by this operation becomes different respectively according to not only the inclination of the slope on the shaping twisted surface (12a,) the length of the slope and the shape of the slope, but also the volume of the top head shaping area (H) generated by the twisted surfaces (12a) and the rate of decreasing the top head shaping area (H) in volume in proportion to the rotational degree of the cutter.

For example, if the slope of the lower twisted surface (12a') on the squeeze fringe portion (12) of the cutter is made to stand like a cutter of a modified example illustrated in the vertical section view of FIG. 20, the top head shaping area (H) generated by the combination of these shaping twisted surfaces (12a') is decreased in volume, and the amount of the food material squeezed and pushed out is decreased, with the result that food expansive behaviour of shaping the food head portion spherically is reduced. While, the friction of these twisted surfaces (12a') and the food surface portion is increased so that the food outer covering drawing action is increased. Accordingly, if this modified cutter is adopted, since outer covering material ($f_2$) is much more gathered into the food head portion, the thickness of the pressing portion (12b) formed as the belt-shaped vertical plane may be decreased proportionally.

Even if the pressing portion (12b) is not provided on the squeeze fringe portion (12) of a cutter, of course, squeezing and pushing operation by the top head shaping area (H) can be performed and spherical shaping can be realized. However, like this embodiment, in the case of cutting bar-shaped food (F) having core and comprising not less than two kinds of food materials, the belt-shaped vertical plane such as this pressing portion (12b), or the slope surface having an almost vertical inclination should be needed in some degree of length.

Then, in order to form a shaping twisted surface (12a) having a large inclination, said basic arc (12A) may be only moved rotatively at the smaller angle against the straight moving amount (L), as referred to FIG. 5. As mentioned above, this twisted surface (12a) should be formed so as to conform with the locus of basic arc (12A), which is made to move straightly to the vertical direction of said supporting point (P) by the necessary length, and then to rotate around the supporting point (P) by the necessary angle. Even if either of the amount of the straight movement and the amount of rotative movement of this basic arc (12A) is changed, the plane figure limited condition in the above mentioned fringe portion of the cutter will be satisfied.

Accordingly, in the cutter of the modified example illustrated in FIG. 20, or in the cutter of the first embodiment described above, since the basic arc (12A) is moved to the thickness direction of the cutter in a predetermined proportion and rotated around the supporting point (P) in the predetermined proportion, the twisted surface (12a) formed as an inclined slope is formed in an almost flat plane though it is twisted. But, the cutter according to the present invention is not restricted to this. For example, the shaping twisted surface (12a) can be formed in twisted and curved shape as referred to FIG. 21, or in twisted wave shape as referred to FIG. 22.

If the twisted slope is formed in such a wave shape as the twisted surface (12a") shown in FIG. 22, "squeezing and pushing operation" and "outer covering drawing action" in the contracting process of the top head shaping area (H) can be performed differently according to the slope position of the shaping twisted surface (12a"). More specifically, regarding the twisted surface (12a") shown in FIG. 22, inclination is small on the upper portion of the twisted slope and it is large on the lower portion of the slope, with the result that the amount of food drawn into the lower portion of the slope on the twisted surfaces (12a") is much more than the amount of food drawn into any other portion.

While, the amount of the food squeezed and pushed out by "squeezing and pushing operation" of the twisted surfaces (12a") changes according to the process of decreasing the top head shaping area (H). This is because the rate of volume decrease in the top head shaping area (H) changes according to the process of decreasing the top head shaping area (H) because the twisted surface (12a") has the wave shape.

In this way, according to the cutter of the present invention, if needed, an optimum cutting process can be performed to various kinds of food materials by changing the shape of the shaping twisted surface (12a) and the width of the pressing portion (12b) according to the material and the diameter of bar-shaped food comprising a kind of food material, or according to the material and the diameter of bar-shaped food having core comprising not less than two kinds of food materials and the proportion of the core material ($f_1$) and outer covering material ($f_2$).

CUTTER OF THE SECOND EMBODIMENT

In the cutters of the second embodiment shown in FIGS. 23 to 28, a permissible groove (13) to permit the squeeze fringe portion (12) of the cutter to move there is characterized in its shape and its making position.

As for the squeeze fringe portion (12) of the cutter of this embodiment, namely, the twisted surface (12a) and the pressing portion (12b), formed similarly to the first embodiment, the twisted surface (12a) is formed in the shape so as to conform with the locus drawn by the basic arc (12A) when the basic arc (12A) is made to move straightly to the vertical direction of the supporting point (P) of the cutter and simultaneously to move rotatively around the supporting point (P), and the pressing portion (12b) is in accordance with the locus drawn by the basic arc (12A) when the basic arc (12A) is only made to move straightly to the vertical direction of the supporting point (P).

Figure 24:
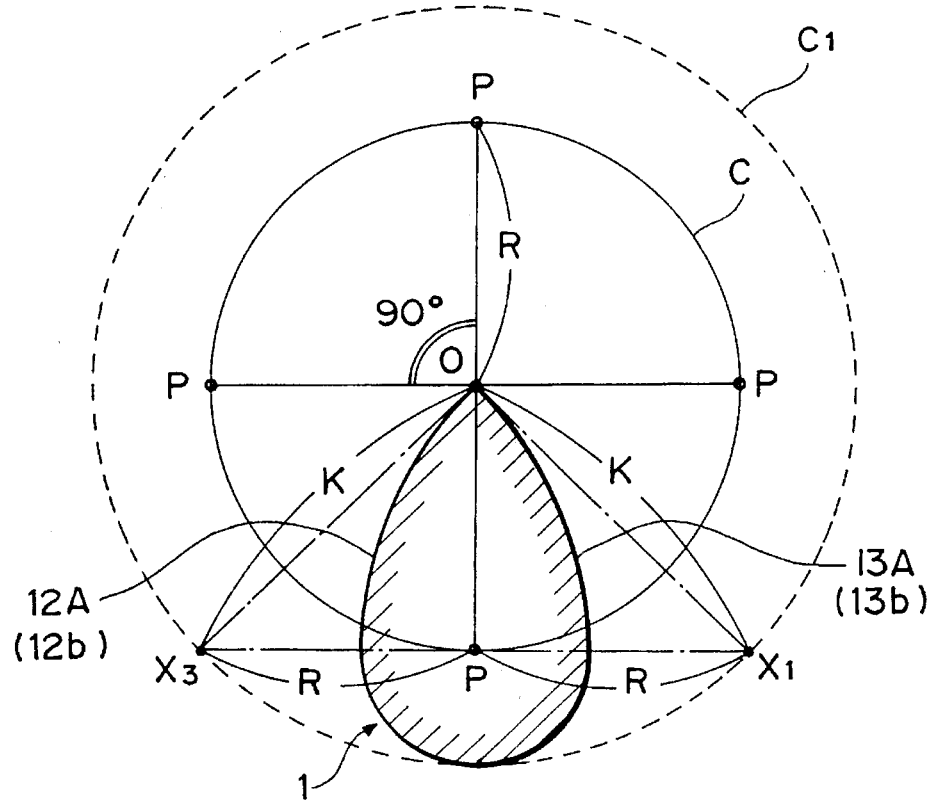
FIG. 24 is a horizontal section view on the level of the pressing portion for explaining the basic arc of this cutter.

The permissible groove (13) of the cutter of this embodiment, namely, one groove bottom portion (13b) which is the bottom portion of the groove and two groove side surfaces (13a) being in plane symmetrical relation and each holding the groove bottom portion (13b) therebetween upward and downward, are formed by the basic arc (13A) described later as a base line, not by the basic arc (12A). As shown in FIG. 24, this basic arc (13A) is defined as an arc, extending from the center (O) to the side of the supporting point (P), drawn with (K) as a radius and the second point ($X_3$) as a center, ($X_3$) being located at the distance of (R) from the supporting point (P) on the temporal circle ($C_1$) drawn by the radius (K) around the center (O). That is, this basic arc (13A) is what the basic arc (12A) is line-symmetrically transferred with the line linking with the center (O) and the supporting point (P) as a reference line.

The groove side surfaces (13a) and the groove bottom portion (13b) are formed by moving this basic arc (13A) straightly and rotationally in the same operation as the case of moving the basic arc (12A) in order to form the twisted surfaces (12a) and the pressing portion (12b). Namely, in the cutter of the present embodiment, the groove side surface (13a) is formed as a twisted locus face drawn by the basic arc (13A) at the time of making the basic arc (13A) move rotationally around the supporting point (P) while making it move straightly to the vertical direction of the supporting point (P) of the cutter. While, the groove bottom portion (13b) is formed as a vertical locus face drawn by the basic arc (13A) at the time of only making the basic arc (13A) move straightly to the vertical direction of the supporting point (P) of the cutter.

In the cutter (1) of this embodiment, since the permissible groove (13) is formed in this way, when the edge ends (11c) are gathered at one point of the center (O), the squeeze fringe portion (12) of each cutter is not abutted firmly to the permissible groove (13) of its neighbouring cutter, differently from the cutter of the first embodiment explained in FIG. 19. Hereinafter, features of the movement according to the cutter of the second embodiment will be explained with reference to FIGS. 25 to 28. Then, in FIGS. 25 to 28, a set of plan view of the cutter and its horizontal section view at the pressing portion (12b) at the same time is illustrated in every step of the movement of the cutter.

Also, in the cutter of this embodiment, sliding relation between the shearing edges (11a) and vertical edge (11b) and the next squeeze fringe portion (12) is similar to that in the cutter of the first embodiment. Accordingly, in the cutter of this embodiment, "clinching and constricting operation" mainly by the pressing portion (12b) and "rubbing and shaping operation" by the twisted surface (12a) are simultaneously performed in the steps indicated in FIGS. 25 and 26. Successively, "cut-off operation" by the shearing edges (11a) and "squeezing and pushing operation" by the top head shaping area (H) are simultaneously performed in the steps indicated in FIGS. 26 and 27.

As a characteristic of this cutter, as shown in the plan view of FIG. 27, rotational movement of the cutters does not stop at the point of gathering the edge ends (11c) at one point and further each cutter continues to rotate to the same direction. That is, as indicated in the plan view of FIG. 28, each edge end (11c) sliding on the twisted surface (12a) of its neighbouring cutter, gathers at one point of the center (O) respectively, and after that, this time, it slides on the groove side surface (13a) of another neighbouring cutter.

In this way, in the cutter of this embodiment, the shearing edges (11a) and vertical edge (11b), in other words, the whole distal end portion of the cutter is always in contact with either of the neighbouring cutters, thereby making it possible to reduce the load added to the shearing edge (11a) and wear of the shearing edge (11a) at the time of "cut-off operation" in the second step. On the contrary, in the case of the cutter of the first embodiment, the vertical edge (11b) is departed from the neighbouring cutter as shown in the horizontal section view of FIG. 18 during this cut-off operation, and each cutter is in contact with each other at only one focus point (=gathering point W, etc.) on the shearing edges (11a). Therefore, wear rate of the shearing edge (11a) becomes comparatively large.

Figure 25A:
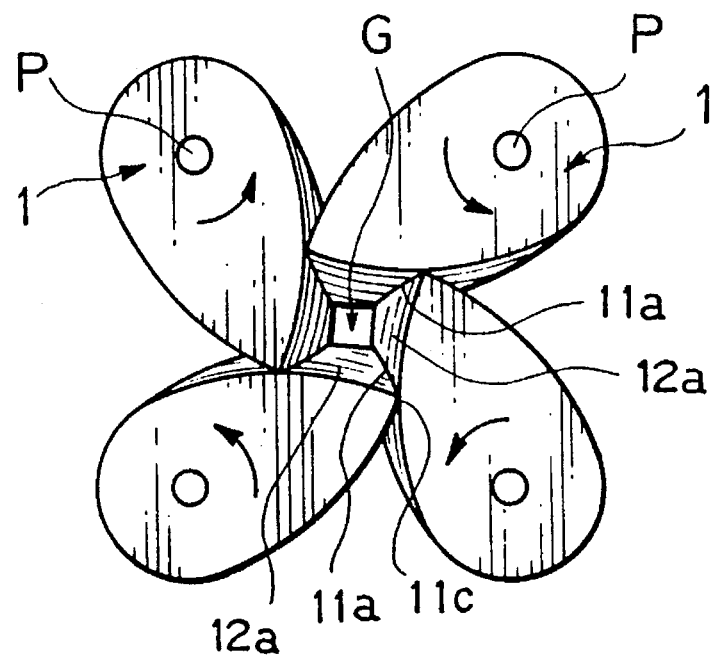
Figure 25B:
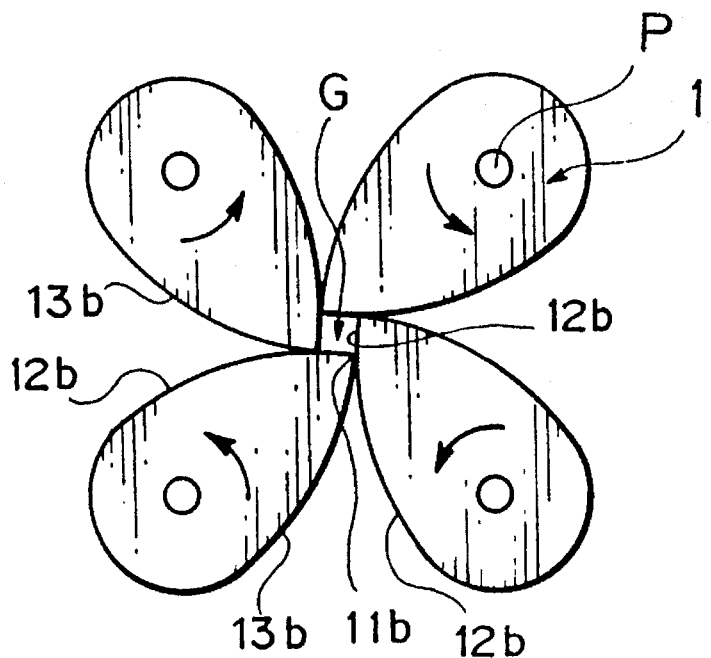
Figure 26A:
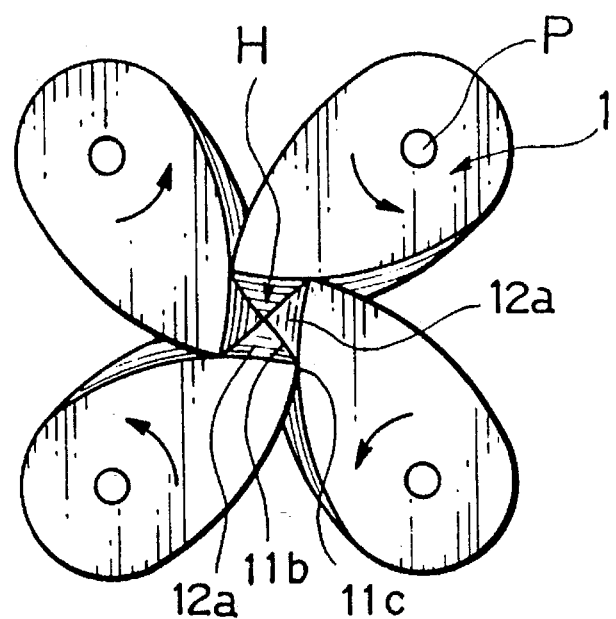
Figure 26B:
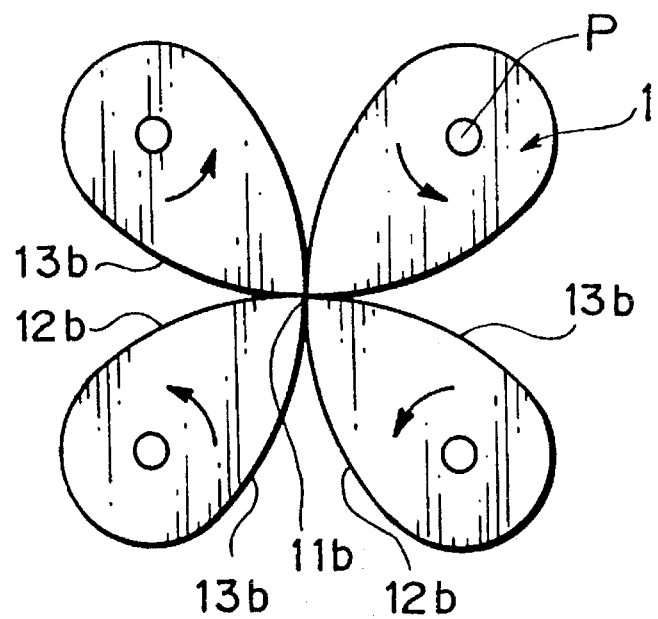
Figure 28A:
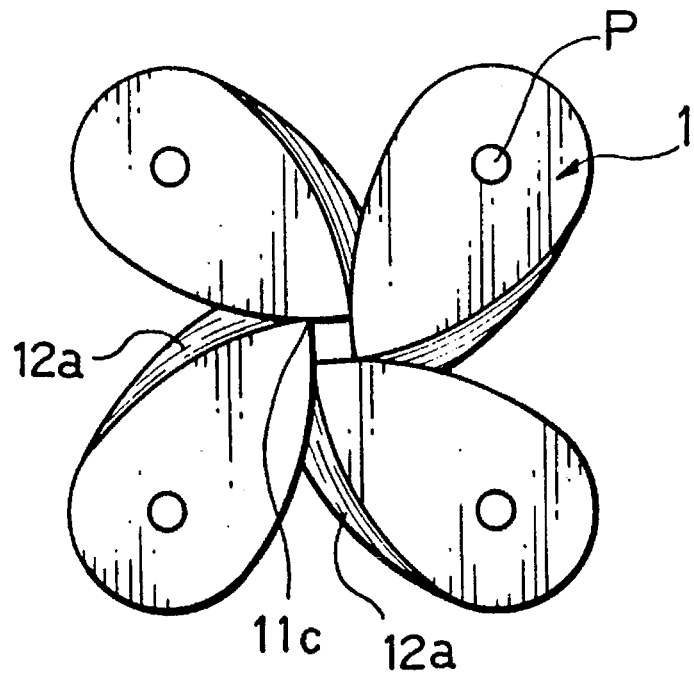
Figure 28B:
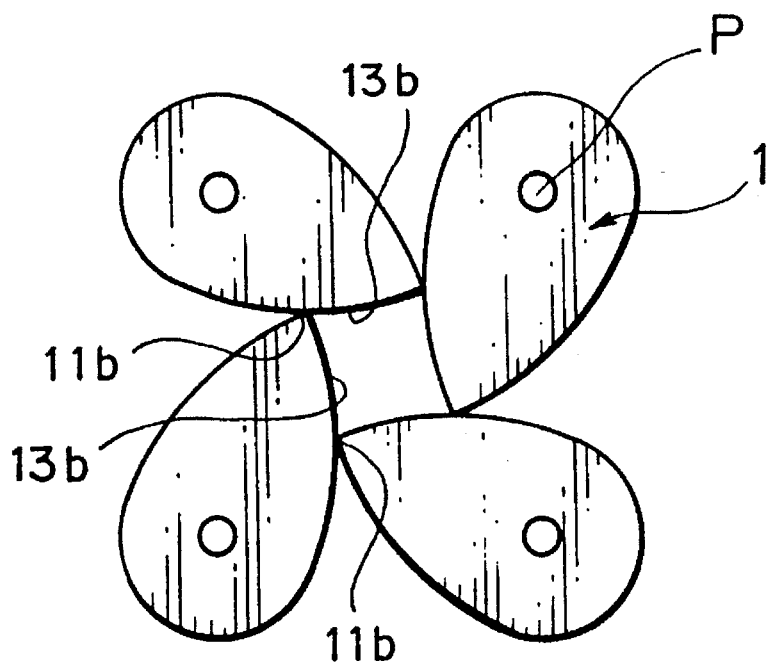

Further, in the cutter of this embodiment, it is also possible to rotate each cutter from the state shown in FIG. 28 further to the same direction as it is, and return it to the state shown in FIG. 25 by turning whole around. If this cutter is adopted, a sequentially cutting process is possible without reversing each cutter.

CUTTER OF THE THIRD EMBODIMENT

Figure 29:
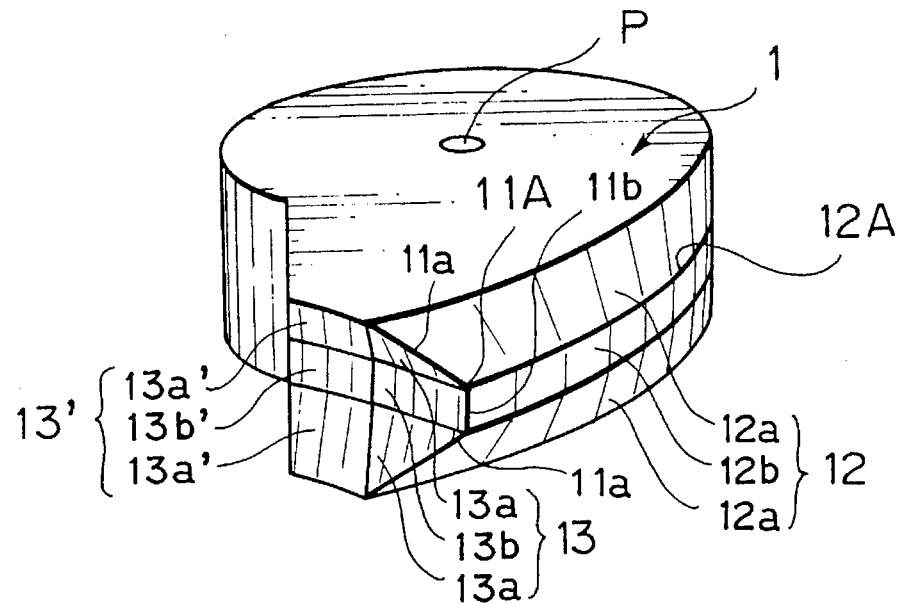
FIG. 29 is an enlarged perspective view explaining the shape of the third embodiment cutter according to the present invention.
Figure 30:
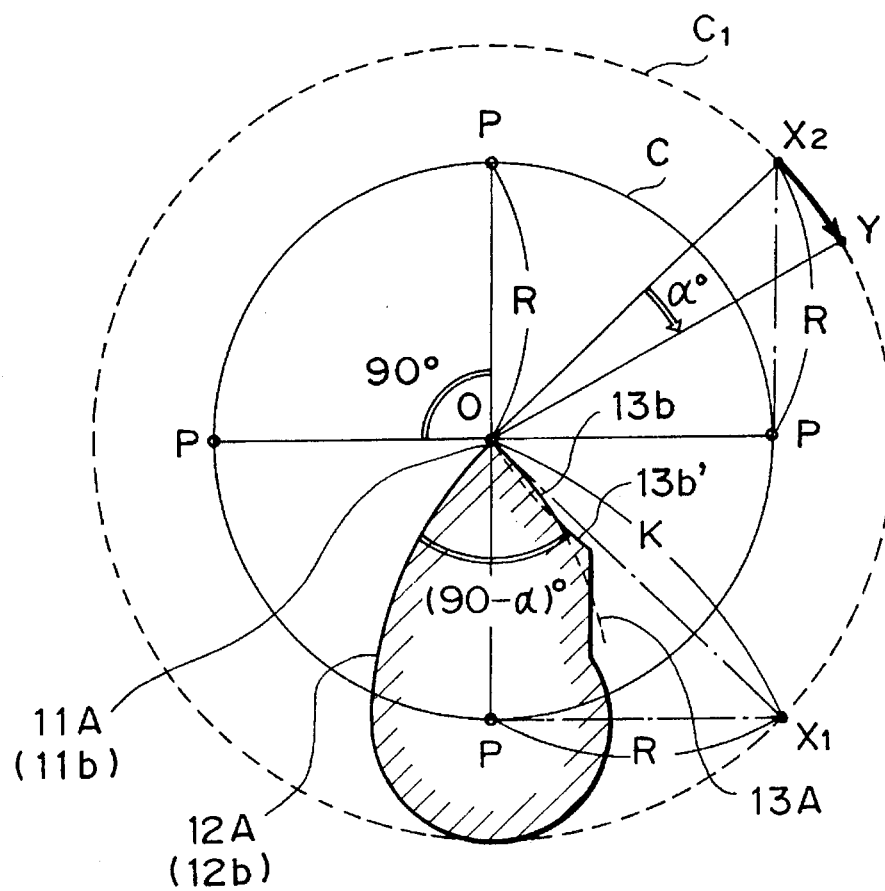
FIG. 30 is a horizontal section view on the level of the pressing portion for explaining the shape of the permissible groove on this cutter.

The cutter of the third embodiment illustrated in FIGS. 29 and 30 is characterized also in the shape of the permissible grooves (13,13') permitting the squeeze fringe portion (12) to move there. The squeeze fringe portion (12), that is, the twisted surfaces (12a) and pressing portion (12b) of the cutter of this embodiment is formed as locus face made by moving the basic arc (12A) in the prescribed operation similarly to the first and second embodiments.

The permissible grooves (13, 13') of the cutter in the third embodiment are formed in the mixed shape of the permissible grooves of the above first and second embodiments. Namely, as shown in FIG. 29, in the cutter of this embodiment, at first, the permissible groove (13) consisting of a groove bottom portion (13b) and two groove sides surfaces (13a) is extended from the vertical edge (11b) and the shearing edges (11a) on the distal end of the cutter, and succeedingly to this permissible groove (13), the second permissible groove (13') consisting of the second groove bottom portion (13b') and two of the second groove side surfaces (13a') is further extended. The permissible groove (13) of these two grooves is formed in the same shape as the permissible groove of the second embodiment, and the second permissible groove (13') is formed in the same shape as the permissible groove of the first embodiment.

Specifically, as is clear in FIG. 30, in the cutter of this embodiment, a part of the permissible groove of the second embodiment cutter is provided at the portion near the distal end of the permissible groove of the first embodiment cutter. According to the cutter (1) of this embodiment, the above problem of wearing the portion of the shearing edge (11a) can be dissolved by making the permissible groove in this way.

That is, also in the case of this cutter, similarly to the second embodiment, not only the sharing edges (11a) but also the whole distal end of the cutter is always in contact with either of the neighbouring cutters, thereby reducing the load added to each shearing edge (11a) at the "cut off operation" in the second step. In a word, in the cutter of this embodiment, the permissible groove (13) protruded outside is provided at the distal end portion of the second permissible groove (13') so as to fill the spaces between each cutter as illustrated in the horizontal section view of FIG. 18.

Then, as mentioned above, since the second permissible groove (13') of this cutter is formed in the same shape and at the same position as the permissible groove of the first embodiment cutter (1), when edge ends (11c) are gathered at one point, this second permissible groove (13') is firmly abutted to the squeeze fringe portion (12) of the neighbouring cutter, so that a sequential plane surface is respectively formed on the top and bottom sides planes of four pieces of cutters.

CUTTER OF THE FOURTH EMBODIMENT

In the cutter of the fourth embodiment illustrated in FIG. 31, the permissible groove (13) permitting the squeeze fringe portion (12) to move there is formed in the shape largely cut off to the side of the supporting point (P). The squeeze fringe portion (12) of this embodiment cutter, namely, the twisted surfaces (12a) and pressing portion (12b) is formed as a locus face shape at the time of making the basic arc (12A) move in a prescribed operation similarly to the first to third embodiments.

As mentioned above, it is a characteristic of the cutter shape according to the present invention, that the twisted surfaces (12a) are formed as a twisted slope by twisting the basic arc (12A) with respect to the supporting point (P) cubically, and that the permissible groove (13) is formed so as to permit the shearing edges (11a) at the end portions of the twisted surfaces (12) formed in this way to move arcly there, so that at least one part of each shearing edge (11a) exceeds one focus point at the position of the center (O), where a small interstice is generated. Only if the shearing edges (11a) each having inclined shape with respect to the rotational plane of the cutter move arcly beyond the one focus point at the position of the center (O), "cut-off operation" by the shearing edges (11a) and "squeezing and pushing operation" by the top head shaping area (H) are performed, so as to cut various kinds of bar-shaped foods sequentially, shaping them spherically without leaving any protrusion on the cut-off surface thereof.

Accordingly, though in the above first to third embodiments cutters, every horizontal plane figure of the permissible grooves (13, 13') is an arc shape with a radius (K) which is the shortest distance between supporting points, the shape of this permissible groove (13) is not restricted to this arc shape.

However, in order to obtain the arc movement such that the shearing edge (11a) can pass the center (O), the position where this permissible groove (13) is formed should be nearer to the side of the center (O) than the position of the permissible groove (13) and the second permissible groove (13') in the third embodiment. Only if this permissible groove (13) is formed at the position nearer to the side of the center (O) than the permissible groove (13) and the second permissible groove (13') in the third embodiment, any shape will do for the permissible groove (13), and it may be formed to be largely cut off like this embodiment cutter. However, in this cutter, each shearing edge (11a) does not slide on the permissible groove (13) similarly to the first embodiment cutter, and therefore, the wearing degree of the shearing edge (11a) becomes comparatively large, and a sequential flat surface on the both sides planes of the cutter cannot be obtained differently from the first to third embodiments cutters. However, it has such an advantage that any delicate technique is not necessary to form this permissible groove (13) of this embodiment cutter, and it can be made by easy cutting work.

In the above, though the forms of cutters according to the present invention are explained in detail with the first to fourth embodiments, the cutter of the present invention is not restricted to the above embodiments but it can be changed in various shapes.

Figure 32:
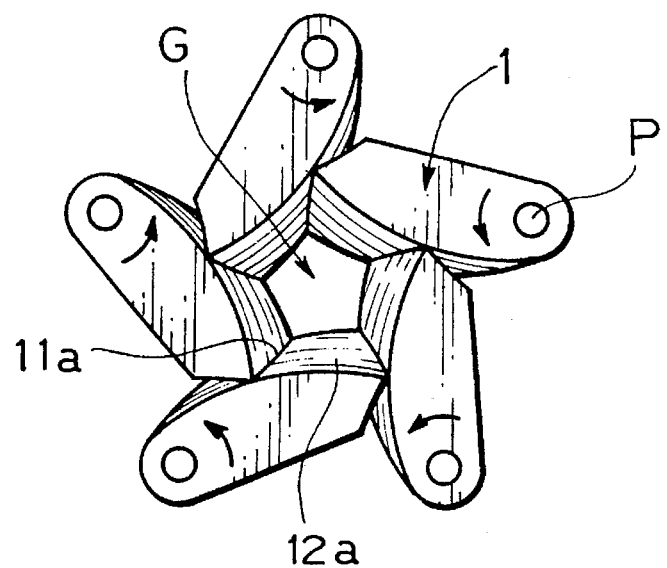
FIG. 32 is a plan view of an important portion showing the shaping cut area generated by a five pieces-typed cutter according to the present invention.
Figure 33:
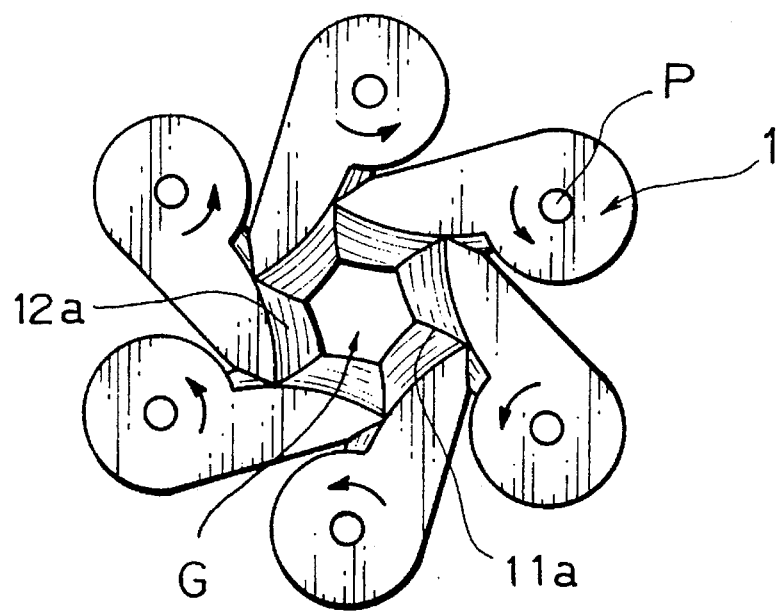
FIG. 33 is a plan view of an important portion showing the shaping cut area generated by a six pieces-typed cutter according to the present invention.

For example, though four pieces typed cutter in which the shaping cut gate (G) is generated by the combination of four pieces of cutters is used in every embodiment mentioned above, it is not restricted to four pieces-type but any pieces not less than three pieces of cutters will do. FIGS. 32 and 33 show five pieces-typed cutter and six pieces-typed cutter respectively. As is clear in the figures, according as the number of cutters is increased, the shaping cut gate (G) can be enlarged and the shape of this gate becomes round, thereby making it possible to clinch and constrict the portion around the bar-shaped food extruded in a log shape from all sides with its log shape intact. However, the more the number of cutters is, the more the cutter system becomes complicated and the sliding portion of cutters becomes increased, and the sliding friction accompanied by the opening and closing or magnifying and reducing movement of the shaping cut gate (G) is increased. Suitable number of cutters may be selected according to the quality of food materials.

BAR-SHAPED FOOD CUTTING APPARATUS

Finally, a whole bar-shaped food cutting apparatus is explained with reference to FIG. 34.

Figure 34:
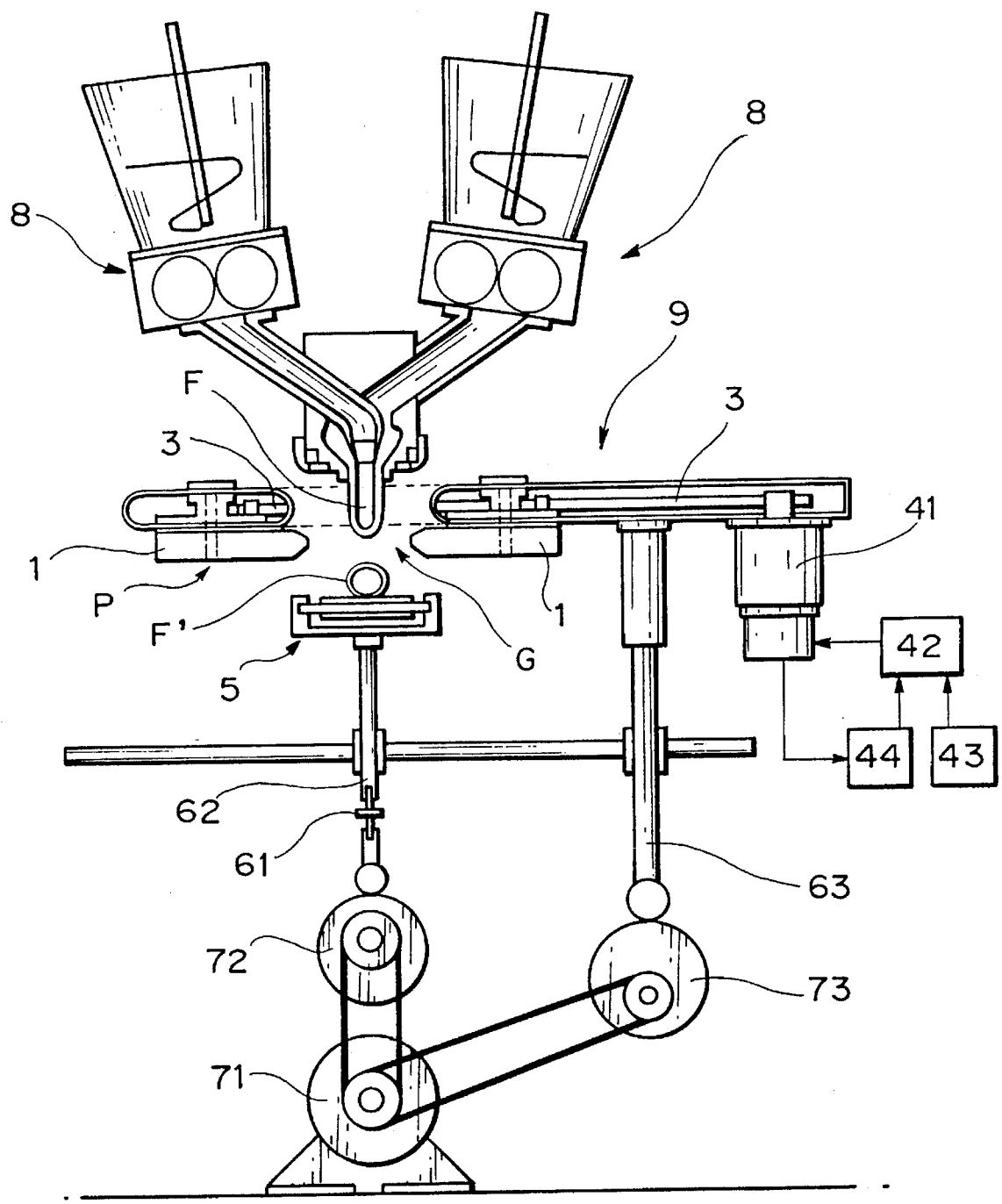
FIG. 34 is a schematic side elevational view explaining the whole construction of the bar-shaped food cutting apparatus according to the present invention.

Numeral (8) in FIG. 34 indicates an extruder pushing out various food material in a serial bar shape. In the apparatus of this embodiment, two units of extruders (8) are deposited so as to extrude the bar-shaped food (F) having core comprising two kinds of food materials into the shaping cut gate (G) generated by cutters (1) positioned at the lower side thereof. Numeral (3) in the figure indicates link members for transmitting driving force of a control motor (41) to each cutter (1). This cutter linking system is similar to that indicated in FIG. 6 as mentioned above. Link members (3) pivotally link each neighbouring cutter, thereby making it possible to rotate each cutter (1) simultaneously.

A motor control device (42), a setting device (43) and a detector (44) are arranged in said control motor (41). If setting values of rotational direction, rotational angle, rotational speed of the control motor (41) are entered into the setting device (43), the motor control device (42) controls the control motor (41) making a comparison between this setting signal and an axial angle detective signal of the control motor (41) outputted by the detector (44). Prepared in this way, the present embodiment makes it possible not only to cut the bar-shaped food (F) but also to produce a snowman-shaped food by rotating cutters reversely halfway during "clinching and constricting operation" in the first step mentioned above so as to make the bar-shaped food (F) pressed and constricted in a degree.

Numeral (5) in the figure indicates a belt conveyor set on the lower portion of the cutting system (9) including cutters (1) so as to perform intermittent operation by a conveyor motor not illustrated, and this belt conveyor (5) conveys the cut-off food (F') to the predetermined position at vertical direction with respect to the paper. The cutting system (9) including this belt conveyor (5) and cutters is constituted so as to move upward and downward through elevating rods (62,63) by the first cam (72) and the second cam (73) moving together with the second motor (71).

According to this vertical movement system, the cut-off food (F') is supported at the time of "squeezing and pushing operation" in the third step by synchronizing the extruding speed of the bar-shaped food (F) and the moving speed of cutters (1) to the vertical direction, and further by vertically moving the belt conveyor according to the vertical movement of the cutters.

Of course, it is not always necessary to keep a constant interval between the cutters (1) and the belt conveyor (5), during the "squeezing and pushing operation" in this third step, and it is possible to change this interval during the "squeezing and pushing operation" by altering the shape of said first cam (72) and second cam (73). Then, this belt conveyor (5) can be altered in its height also by the adjusting bolt system (61) which is provided on the elevating rod (62) linked to the first cam (72), and it can be easily adjusted according to the height of manufacturing food.

INDUSTRIAL APPLICABILITY

As fully explained above, according to the bar-shaped food cutting method and its apparatus in the present invention, it is possible to cut completely viscous and ductile food material such as rice paste, without leaving any protrusion on its cutting surface, while shaping its cutting surface round. It can be used to cut not only rice paste but also various food materials such as bread material, minced meat material, fish meat material, Knoedel or the like.

What is claimed is:

1. A method for cutting bar-shaped food, comprising the steps of:

sequentially extruding food materials to form a bar-shaped food (F), introducing the bar-shaped food (F) into a shaping cut gate (G) generated by at least three cutter pieces (1) each having shearing edges (11a) at its distal end portion and a clinch and squeeze fringe portion (12) on the side from said shearing edges (11a) to a supporting device (P), said cutter pieces (1) being arranged pivotally on each supporting device (P) on equally divided circumference (C) having a center (O) and a radius (R) in a manner such that the shearing edges (11a) of each cutter piece move slidably on the fringe portion (12) of its neighboring cutter, synchronously cutting off the bar-shaped food (F) introduced into the shaping cut gate (G) by synchronously rotating said cutter pieces (1) at one time and opening and closing the shaping cut gate (G) enclosed by said fringe portions (12), reducing said shaping cut gate (G) by clinching and constricting the portion around the food (F) and simultaneously rubbing and shaping the clinched and constricted food (F) by each clinch and squeeze fringe portion (12);

moving in an arc each shearing edge (11a) so that at least one part of the shearing edge (11a) exceeds the center (O), cutting off the clinched and constricted food (F) by moving each shearing edge (11a) so that said edges pass and contact one another at a point, squeezing and pushing the cut-off food (F') existing in a top head shaping area (H) so as to shape the surface of the cut-off food (F') spherically by reducing the top head shaping area (H) with the cut-off food (F') supported on a vertically movable conveyor (5), the top head shaping area (H) being generated by the combination of the clinch and squeeze fringe portions (12), and pressing the surface of the cut-off food (F') into a substantially round shape.

2. A method according to claim 1, a vertical belt-shaped pressing portion (12b) which is protruded to the side of the bar-shaped food (F) in an arc shape on the substantially middle portion of the clinch and squeeze fringe portion (12) of each cutter piece, whereby in the process of reducing the shaping cut gate (G) enclosed by each fringe portion (12), the pressing portions (12b) clinch and constrict the portion around the bar-shaped food (F) with their faces, thereby cutting the bar-shaped food (F) having core material ($f_1$) and outer cover material ($f_2$) which comprise not less than two kinds of food materials, without exposing its core material ($f_1$) to the surface of the outer covering material ($f_2$).

3. An apparatus for cutting bar-shaped food comprising:

extruders (8) for pushing out sequentially various kinds of food materials to form a bar-shaped food (F);

a cutting system portion (9) comprising at least three cutter pieces (1), wherein each cutter piece (1) has a supporting device (P) at a position on an equally divided circumference (C) with a center (O) and a radius (R), and distal end portions are synchronously rotated at one time by driving a control motor (41), shearing edges (11a) are formed at each distal end portion of these cutter pieces (1) in such a manner that at least one part of the edge (11a) moves in an arc beyond said center (O), a clinch and squeeze fringe portion (12) for generating a shaping cut gate (G) which is opened and closed at the portion of said center (O) is formed on one side fringe portion regarding the shearing edge (11a), and a groove (13) for permitting the clinch and squeeze fringe portion (12) of the neighboring cutter piece (1) to move there is formed on the other side fringe portion regarding the shearing edge (11a), said clinch and squeeze fringe portion (12) being formed in a locus face drawn by a basic arc (12A) when this basic arc is made to move to the vertical direction with respect to said supporting device (P) by a length and simultaneously to rotate around the supporting device (P) by an angle, the basic arc (12A) being drawn from said center (O) with a point ($X_1$) as a center and a radius (K), the point ($X_1$) being on a temporal circle ($C_1$) around said center (O) with the radius (K) and at distance (R) from said supporting device (P), the radius (K) being the distance between the neighboring supporting device (P) and the neighboring device (P); and a conveyor (5) provided in a vertically movable manner regarding said cutting system portion (9) so as to put food (F') which is cut off in said cutting system portion (9) thereon and to transfer it to a destination, wherein said cutter pieces (1) are synchronously rotated at one time thereby reducing said shaping cut gate (G), wherein each clinch and squeeze fringe portion (12) clinches and constricts the bar-shaped food (F) extruded and supplied from said extruders (8) and said cutter pieces simultaneously rub the constricted portion of said food (F) to be shaped, wherein each shearing edge (11a) is moved in an arc so that at least one part of the edge (11a) exceeds said center (O), and the constricted food (F) is cut off by moving each shearing edge (11a) so that it contacts one another at the point, the food material existing in a top head shaping area (H) is squeezed and pushed so as to shape the surface of a cut-off food (F') spherically by reducing the top head shaping area (H) with the cut-off food (F') supported on a vertically movable conveyor (5), the area (H) being generated by the combination of the clinch and squeeze fringe portions (12) and thereby pressing the surface of the cut-off food (F') into a substantially round shape.

4. An apparatus according to claim 3, further comprising a vertical belt-shaped pressing portion (12b) which is formed in the locus face drawn by said basic arc (12A) at the time of making the basic arc (12A) move to the vertical direction with respect to the supporting device (P) by the length is provided on the substantially middle portion of the clinch and squeeze fringe portion (12) for generating the shaping cut gate (G) which is opened and closed at the portion around the center (O).

5. An apparatus according to claim 3, further comprising the groove (13) of each cutter piece (1) is formed into a shape so as to conform with a shape drawn when the clinch and squeeze fringe portion (12) is made to move rotationally with a vertical line (Q) linking edge ends (11c) of the shearing edges (11a) as a reference line by the central angle made by the supporting device (P) and its neighboring device (P), or by the angle less than said central angle to the side of the next supporting device (P) of said cutter piece (1).

6. An apparatus according to claim 3, wherein the groove (13) of each cutter piece (1) is formed in a locus face drawn by a basic arc (13A) when this basic arc (13A) is made to move to the vertical direction with respect to the supporting device (P) by said length and simultaneously to rotate around the supporting device (P) by the angle, said basic arc (13A) being drawn from the center (O) with the radius (K) and with a center of the point ($X_3$) obtained on the temporal circle ($C_1$) at the distance (R) from the supporting device (P) and on the opposite side to the point ($X_1$).

7. An apparatus according to claim 3, wherein the shape of the groove (13) of each cutter piece on the side of the shearing edges (11a) is formed in a locus face drawn by a basic arc (13A) when this basic arc (13A) is made to move to the vertical direction with respect to the supporting device (P) by said length and simultaneously to rotate around the supporting device (P) by the angle, said basic arc (13A) being drawn from the center (O) with the radius of (K) and a center of the point ($X_3$) obtained on the temporal circle ($C_1$) at the distance (R) from the supporting point device (P) and on the opposite side to the point ($X_1$), wherein the shape of said groove (13) on the opposite side to the shearing edges (11a) is formed in the shape so as to conform with the clinch and squeeze fringe portion (12) which is made to move rotationally with a vertical line (Q) linking edge ends (11c) of shearing edges (11a) as a reference line by the central angle made by the supporting device (P) and its neighboring supporting device (P), or by the angle less than said central angle to the side of the next supporting device (P) of said cutter piece (1).

* * * * *